United States Patent
Kuniyasu et al.

(10) Patent No.: US 11,889,803 B2
(45) Date of Patent: Feb. 6, 2024

(54) PLANT GROWTH LIGHTING FIXTURE

(71) Applicant: FUJIFILM Corporation, Tokyo (JP)

(72) Inventors: Satoshi Kuniyasu, Minamiashigara (JP); Ryosuke Shimizu, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 448 days.

(21) Appl. No.: 17/324,196

(22) Filed: May 19, 2021

(65) Prior Publication Data

US 2021/0267139 A1    Sep. 2, 2021

Related U.S. Application Data

(63) Continuation of application No. PCT/JP2019/043780, filed on Nov. 8, 2019.

(30) Foreign Application Priority Data

Dec. 14, 2018  (JP) ................... 2018-234354

(51) Int. Cl.
*A01G 9/24* (2006.01)
*F21V 9/40* (2018.01)
(Continued)

(52) U.S. Cl.
CPC .............. *A01G 9/249* (2019.05); *A01G 7/045* (2013.01); *F21V 9/14* (2013.01); *F21V 9/40* (2018.02);
(Continued)

(58) Field of Classification Search
CPC .......... A01G 9/249; A01G 7/045; A01G 7/04; A01G 9/24; A01G 7/00; G02B 5/3016; F21Y 2115/10; F21Y 2115/15
See application file for complete search history.

(56) References Cited

U.S. PATENT DOCUMENTS 6,459,919 B1 * 10/2002 Lys ........................ H05B 47/18
                                                 600/407
9,759,600 B2 * 9/2017 Ichihashi ............. G02B 5/3016
(Continued)

FOREIGN PATENT DOCUMENTS

JP    2008-228688 A    10/2008
JP    2012-226229 A    11/2012
(Continued)

OTHER PUBLICATIONS

Notice of Reasons for Refusal dated Jul. 19, 2022 from the Japanese Patent Office in Japanese Application No. 2020-559828.
(Continued)

*Primary Examiner* — Ebony E Evans
(74) *Attorney, Agent, or Firm* — Sughrue Mion, PLLC

(57) ABSTRACT

A plant growth lighting fixture has two or more of a blue light source, a green light source, and a red light source and a reflective-type circularly polarizing plate having two or more of a blue-reflecting cholesteric liquid crystal layer having a center wavelength of an effective wavelength range in blue light, a green-reflecting cholesteric liquid crystal layer having a center wavelength of an effective wavelength range in green light, and a red-reflecting cholesteric liquid crystal layer having a center wavelength of an effective wavelength range in red light. The wavelength ranges of the emission center wavelengths as the light sources and the wavelength ranges of the center wavelength of the effective wavelength range as the reflective-type circularly polarizing plate are wavelength ranges of the same colors, and the reflective-type circularly polarizing plate has a polarization correction layer having a phase difference in a thickness direction.

11 Claims, 3 Drawing Sheets

(51) Int. Cl.
  *A01G 7/04* (2006.01)
  *F21V 9/14* (2006.01)
  *G02B 5/30* (2006.01)
  *F21Y 115/10* (2016.01)

(52) U.S. Cl.
  CPC ......... *G02B 5/3016* (2013.01); *F21Y 2115/10* (2016.08)

(56) References Cited

U.S. PATENT DOCUMENTS

| | | | |
|---|---|---|---|
| 10,794,568 B2* | 10/2020 | Usami | .................. A01G 9/1438 |
| 2014/0041296 A1 | 2/2014 | Ichihashi et al. | |
| 2015/0075069 A1* | 3/2015 | Ichihashi | .................. F21V 9/14 |
| | | | 47/17 |
| 2015/0101246 A1 | 4/2015 | Usami et al. | |
| 2015/0335246 A1* | 11/2015 | Rains, Jr. | .............. F21V 14/003 |
| | | | 362/231 |
| 2016/0198640 A1 | 7/2016 | Singh et al. | |
| 2016/0223730 A1* | 8/2016 | Kim | .................. G02F 1/133536 |
| 2017/0160452 A1 | 6/2017 | Yasuda | |

FOREIGN PATENT DOCUMENTS

| | | | | |
|---|---|---|---|---|
| JP | 3198211 U | 6/2015 | | |
| JP | 5981780 B2 | 8/2016 | | |
| KR | 20160098751 A | * 8/2016 | ............... | G02B 5/30 |
| WO | WO-2012144400 A1 | * 10/2012 | ............ | A01G 7/045 |
| WO | WO-2012144422 A1 | * 10/2012 | ............ | A01G 7/045 |
| WO | 2016/043219 A1 | 3/2016 | | |

OTHER PUBLICATIONS

International Search Report dated Feb. 4, 2020 from the International Searching Authority in International Application No. PCT/JP2019/043780.

Written Opinion dated Feb. 4, 2020 from the International Searching Authority in International Application No. PCT/JP2019/043780.

International Preliminary Report on Patentability with the translation of Written Opinion dated Jun. 8, 2021 from the International Bureau in International Application No. PCT/JP2019/043780.

* cited by examiner

PLANT GROWTH LIGHTING FIXTURE

CROSS-REFERENCE TO RELATED APPLICATIONS

This application is a Continuation of PCT International Application No. PCT/JP2019/043780 filed on Nov. 8, 2019, which claims priority under 35 U.S.C § 119(a) to Japanese Patent Application No. 2018-234354 filed on Dec. 14, 2018. Each of the above application(s) is hereby expressly incorporated by reference, in its entirety, into the present application.

BACKGROUND OF THE INVENTION

1. Field of the Invention

The present invention relates to plant growth lighting fixture for promoting plant growth.

2. Description of the Related Art

In a plant factory, which is a system whose internal environment is controlled for planned plant production in a closed or semi-closed space, plant growth is controlled by regulating conditions such as temperature, fertilizer, light irradiation time, and illuminance of irradiation light.

It is thought that the polarization state of light may have a certain effect on, for example, plant growth. For example, JP2008-228688A discloses a biological behavior control apparatus including a polarized light irradiation mechanism. This publication discloses that, in an experiment using this apparatus, irradiation with red right-handed circularly polarized light alone promoted the growth of *Arabidopsis thaliana*.

As such a plant growth lighting fixture for the promotion of plant growth by irradiation with particular circularly polarized light, a plant growth lighting fixture (illumination apparatus for plant growth) disclosed in JP2012-226229A is known.

This plant growth lighting fixture includes a light source and a polarization state control member that controls the polarization state of light emitted from the light source. The plant growth lighting fixture is configured to convert the polarization state in a certain wavelength range of the light emitted from the light source into circularly polarized light so that, of the irradiation light, light in an effective wavelength range (a control wavelength range) has a degree of circular polarization of 0.3 or more. In JP2012-226229A, a reflective-type circularly polarizing plate that selectively reflects circularly polarized light having a particular rotational direction in a particular wavelength range is given as an example of the polarization state controlling member.

SUMMARY OF THE INVENTION

The plant growth lighting fixture disclosed in JP2012-226229A, which is a plant growth lighting fixture for the promotion of plant growth, requires fewer components for polarization state control.

To promote plant growth, it is advantageous that the irradiation light have a higher degree of circular polarization in a wavelength range where plant growth can be promoted. The plant growth lighting fixture disclosed in JP2012-226229A can suitably promote plant growth because the degree of circular polarization in the effective wavelength range is 0.3 or more.

Here, plant growth lighting fixtures of the related art, such as the plant growth lighting fixture disclosed in JP2012-226229A, are usable only for plants whose growth can be promoted with circularly polarized light in a particular wavelength range, such as plants whose growth can be promoted when irradiated with red right-handed circularly polarized light.

In the case of, for example, a plant growth lighting fixture that radiates red right-handed circularly polarized light, further improvements are required to be used for plants whose growth is promoted by irradiation with blue right-handed or left-handed circularly polarized light.

An object of the present invention is to provide a plant growth lighting fixture that promotes plant growth, the plant growth lighting fixture being usable for the growth promotion of plants whose growth can be promoted by circularly polarized light of different colors and, in addition, being able to radiate light of every color with a high degree of circular polarization.

To achieve the above object, the present invention has the following configuration.

[1] A plant growth lighting fixture includes light sources and a reflective-type circularly polarizing plate having cholesteric liquid crystal layers formed by fixing a cholesteric liquid crystalline phase.

When a wavelength range of 380 nm or more and 500 nm or less is a blue wavelength range, a wavelength range of more than 500 nm and less than 600 nm is a green wavelength range, and a wavelength range of 600 nm or more and 780 nm or less is a red wavelength range.

The light sources have two or more of a blue light source having an emission center wavelength in the blue wavelength range, a green light source having an emission center wavelength in the green wavelength range, and a red light source having an emission center wavelength in the red wavelength range.

The reflective-type circularly polarizing plate has two or more of a blue-reflecting cholesteric liquid crystal layer having a center wavelength of an effective wavelength range in the blue wavelength range, a green-reflecting cholesteric liquid crystal layer having a center wavelength of an effective wavelength range in the green wavelength range, and a red-reflecting cholesteric liquid crystal layer having a center wavelength of an effective wavelength range in the red wavelength range.

The wavelength ranges of the emission center wavelengths as the light sources and the wavelength ranges of the center wavelength of the effective wavelength range as the reflective-type circularly polarizing plate are wavelength ranges of the same colors.

The reflective-type circularly polarizing plate further has a polarization correction layer having a phase difference in a thickness direction.

[2] In the plant growth lighting fixture according to [1], the polarization correction layer is a C-plate.

[3] In the plant growth lighting fixture according to [1] or [2], the light sources have the blue light source and the red light source, and the reflective-type circularly polarizing plate has the blue-reflecting cholesteric liquid crystal layer and the red-reflecting cholesteric liquid crystal layer.

[4] The plant growth lighting fixture according to any one of [1] to [3] further has an auxiliary light source for emitting white light.

[5] In the plant growth lighting fixture according to any one of [1] to [4], the cholesteric liquid crystal layers of the reflective-type circularly polarizing plate selectively reflect circularly polarized light having the same rotational direction.

[6] In the plant growth lighting fixture according to any one of [1] to [4], the cholesteric liquid crystal layers of the reflective-type circularly polarizing plate selectively reflect circularly polarized light having different rotational directions.

[7] In the plant growth lighting fixture according to any one of [1] to [6], the reflective-type circularly polarizing plate has a haze of 1% or less.

[8] In the plant growth lighting fixture according to any one of [1] to [7], at least one of the cholesteric liquid crystal layers of the reflective-type circularly polarizing plate has scattering properties.

[9] In the plant growth lighting fixture according to any one of [1] to [8], the reflective-type circularly polarizing plate further has a support for supporting the cholesteric liquid crystal layers.

[10] In the plant growth lighting fixture according to any one of [1] to [9], the light sources each include a plurality of light sources arranged in a single direction.

[11] In the plant growth lighting fixture according to any one of [1] to [10], the light sources are LEDs.

The plant growth lighting fixture according to the present invention radiates particular circularly polarized light in a particular wavelength range and thus is usable for the growth promotion of plants whose growth can be promoted by circularly polarized light of different colors. In addition, the plant growth lighting fixture can radiate circularly polarized light of every color with a high degree of circular polarization.

DESCRIPTION OF THE PREFERRED EMBODIMENTS

Figure 1:
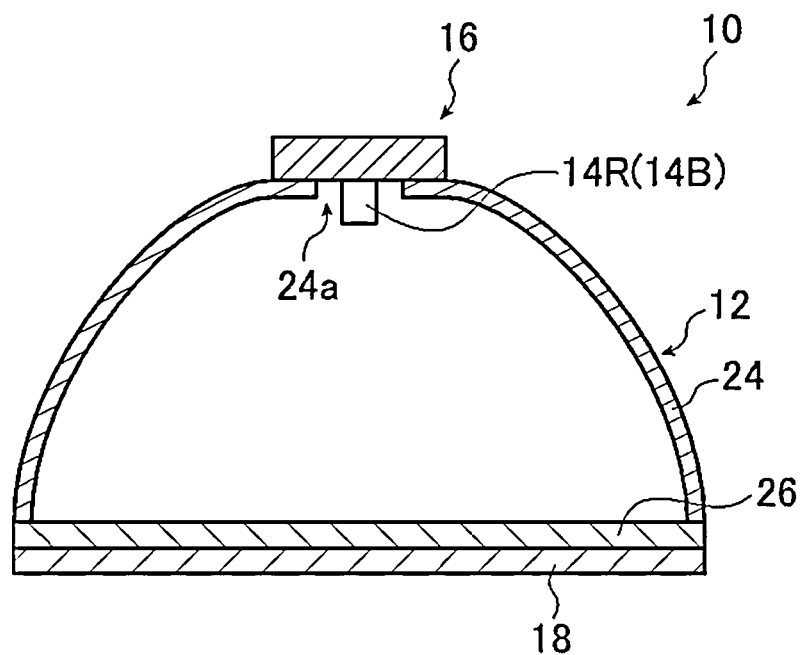
FIG. 1 is a sectional view conceptually illustrating an example of a plant growth lighting fixture according to the present invention.

Hereinafter, a plant growth lighting fixture according to the present invention will be described in detail on the basis of preferred examples illustrated in the accompanying drawings.

In the present invention, a numerical range expressed using "to" means a range including numerical values before and after "to" as the lower and upper limits.

In the present invention, blue light means light in a wavelength range of 380 to 500 nm (blue wavelength range), green light means light in a wavelength range of more than 500 nm and less than 600 nm (green wavelength range), and red light means light in a wavelength range of 600 to 780 nm (red wavelength range).

Therefore, visible light means light in a wavelength range of 380 to 780 nm, ultraviolet light means light with a wavelength of less than 380 nm, and infrared light means light with a wavelength of more than 780 nm.

In the present invention, Re ($\lambda$) and Rth ($\lambda$) respectively represent an in-plane retardation and a thickness-direction retardation at a wavelength $\lambda$. Unless otherwise specified, the wavelength $\lambda$ is 550 nm.

In the present invention, Re ($\lambda$) and Rth ($\lambda$) are values measured at a wavelength $\lambda$ with AxoScan (manufactured by Axometrics). By inputting an average refractive index ((nx+ny+nz)/3) and a thickness (d (μm)) into AxoScan, a slow axis direction (°), Re ($\lambda$)=R0 ($\lambda$), and Rth ($\lambda$)=((nx+ny)/2−nz)×d are calculated.

R0 ($\lambda$), which is indicated as a value calculated by AxoScan, means Re ($\lambda$).

In the present invention, refractive indices nx, ny, and nz are measured with an Abbe refractometer (NAR-4T manufactured by ATAGO CO., LTD.) using a sodium lamp ($\lambda$=589 nm) as a light source. When a wavelength dependence is measured, it can be measured with a DR-M2 multi-wavelength Abbe refractometer (manufactured by ATAGO CO., LTD.) using a dichroic filter in combination.

Values in Polymer Handbook (JOHN WILEY & SONS, INC.) and various optical film catalogs can be used. For example, average refractive index values of main optical films are as follows: cellulose acylate (1.48), cycloolefin polymer (1.52), polycarbonate (1.59), polymethyl methacrylate (1.49), and polystyrene (1.59).

Figure 2:
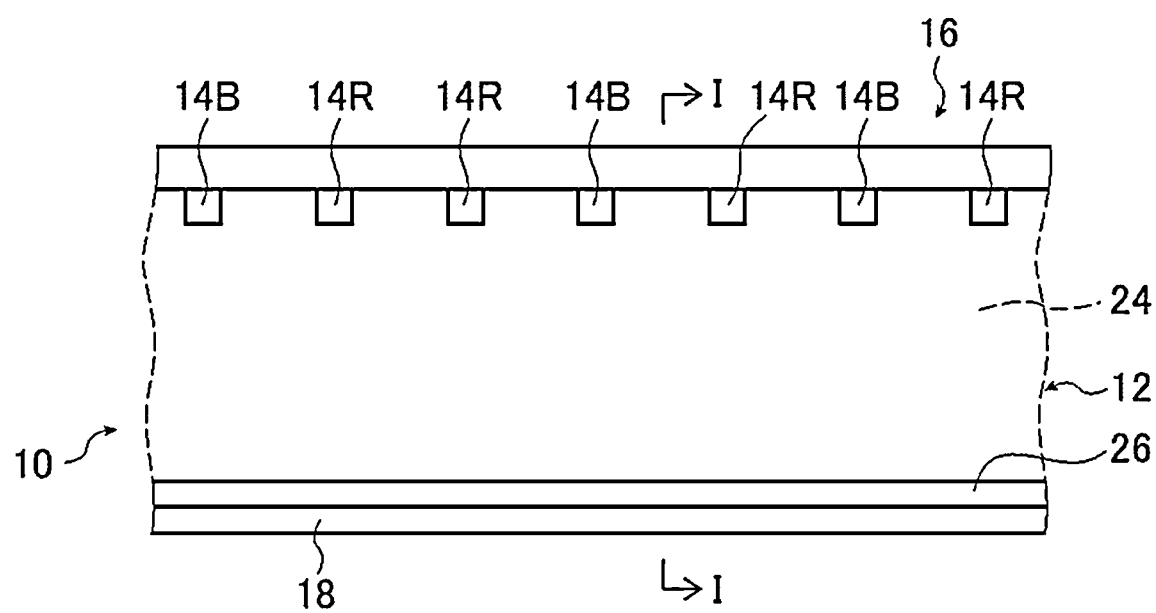
FIG. 2 is a conceptual illustration of the plant growth lighting fixture illustrated in FIG. 1 as viewed from another direction.

FIG. 1 and FIG. 2 conceptually illustrate an example of the plant growth lighting fixture according to the present invention.

FIG. 1 conceptually illustrates a section taken perpendicular to the longitudinal direction of a plant growth lighting fixture 10 according to the present invention. FIG. 2 is a conceptual illustration of the plant growth lighting fixture 10 according to the present invention as viewed from the transverse direction, that is, the direction perpendicular to FIG. 1. That is to say, FIG. 1 is a sectional view taken along line I-I of FIG. 2.

The plant growth lighting fixture 10 shown in the illustrated example is an apparatus for irradiating a plant with circularly polarized light (light with circular polarization) having a particular rotational direction in a particular wavelength range (wavelength region), the circularly polarized light being capable of promoting plant growth. The plant growth lighting fixture 10 has a lighting fixture main body 12, a light source unit 16 having a blue light source 14B and a red light source 14R, and a reflective-type circularly polarizing plate 18.

As will be described later, in the plant growth lighting fixture 10 according to the present invention, the reflective-type circularly polarizing plate 18 has a cholesteric liquid crystal layer formed by fixing a cholesteric liquid crystalline phase.

As is well known, a cholesteric liquid crystal layer has an effective wavelength range, that is, a selective reflection wavelength range, and selectively reflects right-handed circularly polarized light or left-handed circularly polarized light in the effective wavelength range. Specifically, the cholesteric liquid crystal layer reflects left-handed circularly polarized light in the effective wavelength range and transmits all the other light including right-handed circularly polarized light in the effective wavelength range. Alternatively, the cholesteric liquid crystal layer reflects right-handed circularly polarized light in the effective wavelength range and transmits all the other light including left-handed circularly polarized light in the effective wavelength range.

Thus, the plant growth lighting fixture 10 according to the present invention can radiate highly circularly polarized light containing a large proportion of circularly polarized light (circularly polarized component) having a rotational direction that enables the promotion of plant growth in a desired wavelength range that enables the promotion of plant growth, and can suitably promote plant growth.

In other words, the plant growth lighting fixture 10 according to the present invention can irradiate a plant with light containing a large proportion of circularly polarized light having a particular rotational direction that contributes to plant growth in a particular wavelength range that enables the promotion of plant growth.

In addition to the members illustrated, the plant growth lighting fixture 10 may optionally have various members used for known plant growth lighting fixtures (light irradiation apparatuses), such as reflective members, heat-dissipating members, infrared-absorbing members, ultraviolet-absorbing members, lenses, prisms, and control circuits for switching on and off the light sources 14.

Lighting Fixture Main Body

As described above, the plant growth lighting fixture 10 has the lighting fixture main body 12, the light source unit 16 having the light sources 14, and the reflective-type circularly polarizing plate 18.

The lighting fixture main body 12 has a housing 24 and a light-transmitting plate 26.

The housing 24 has a substantially arcuate sectional shape and has an opening 24a at the top of the arc. The blue light source 14B and the red light source 14R are inserted through the opening 24a, and the light source unit 16 is fixed to the housing 24, that is, the lighting fixture main body 12, from the outside at the top of the arc of the housing 24.

As illustrated in FIG. 2, the plant growth lighting fixture 10, that is, the housing 24 has an elongated shape. Therefore, the housing 24 has a shape of a minor arc obtained by cutting a hollow and substantially columnar (cylindrical) substance in the height direction.

FIG. 1 is a section along a direction perpendicular to the longitudinal direction of the plant growth lighting fixture 10 (the height direction of the cylinder) (section along line I-I of FIG. 2). Therefore, in FIG. 1, the housing 24 is elongated in a direction perpendicular to the drawing plane. In FIG. 2, to clearly show the configuration of the plant growth lighting fixture 10, the housing 24 is shown as a dashed line and omitted, and the light sources 14 and other members are explicitly illustrated.

The inner surface of the housing 24 is a light reflective surface. That is to say, the housing 24 acts as a reflector in the plant growth lighting fixture 10.

The inner surface of the housing 24 is not limited, and various light reflective surfaces used, for example, in optical instruments can be used. Examples of light reflective surfaces include metal films, white surfaces, and diffuse reflective surfaces. Alternatively, the housing 24 may be formed of, for example, a metal material, a white material, or a light diffusive material so that the inner surface of the housing 24 is a light reflective surface.

In the illustrated example, the housing 24 has a substantially arcuate sectional shape, but the present invention is not limited to this shape.

The sectional shape of the housing 24 need not be substantially arcuate and may be rectangular, trapezoid, triangular, parabolic, or other various shapes.

The housing 24, that is, the plant growth lighting fixture according to the present invention need not be elongated and may have a planar shape (the shape of the light-transmitting plate 26) such as a circle, a square, or a triangle. However, to enable the promotion of plant growth over a large area, the plant growth lighting fixture according to the present invention is preferably configured such that the housing 24 is elongated and a plurality of the light sources 14 are arranged as described below.

The longitudinal length of the housing 24, that is, the plant growth lighting fixture 10, is not limited, and in view of, for example, handleability of the plant growth lighting fixture 10 and processing cost, it is preferably 50 to 200 cm, more preferably 100 to 150 cm.

The transverse length of the housing 24, that is, the plant growth lighting fixture 10, is not limited, and in view of, for example, handleability of the plant growth lighting fixture 10 and processing cost, it is preferably 3 to 30 cm, more preferably 5 to 10 cm.

As described above, the open side of the housing 24 is closed by the light-transmitting plate 26. Therefore, the light-transmitting plate 26 is elongated as with the housing 24 and has a rectangular shape. In the plant growth lighting fixture 10, the light-transmitting plate 26 serves as a surface from which light from the lighting fixture main body 12 is radiated.

In the present invention, the open side of the housing 24 may be closed by the light-transmitting plate 26 in any configuration. For example, the open side of the housing 24 may also be closed by the reflective-type circularly polarizing plate 18 described later.

The light-transmitting plate 26 may be any plate-like material having the same planar shape as the open side of the housing 24, that is, an exit surface (exit port) for light from the housing 24, as long as it can transmit light emitted from the light sources 14 at a sufficient transmittance.

The light-transmitting plate 26 need not necessarily have such a shape that the open side of the housing 24 is completely closed. That is to say, the light-transmitting plate 26 may be such that there is a surrounding space between the light-transmitting plate 26 and the housing 24 or may have regular or irregular through-holes, as long as it has an area sufficient for affixation of the reflective-type circularly polarizing plate 18 described later.

The lighting fixture main body 12, the housing 24, and the light-transmitting plate 26 may be formed of any type of material that has sufficient resistance to light and heat emitted from the light sources 14 and has sufficient mechanical strength.

Examples include resin materials such as polycarbonate (PC), polyethylene terephthalate (PET), polypropylene, polyethylene, and acrylic resins.

The housing 24 and the light-transmitting plate 26 may be formed of the same material or different materials. When the housing 24 and the light-transmitting plate 26 are formed of the same material, the housing 24 and the light-transmitting plate 26 may be integrally molded. If necessary, the light-transmitting plate 26 may be formed by known means so as to be detachable from the housing 24.

When the housing 24 and the light-transmitting plate 26 are not integrally molded, they may be fixed to each other by known means such as an adhesive, a fixing jig, fitting of a protrusion into a recess, fastening with a screw, or a bolt and a nut.

Light Source

As described above, the opening 24a is formed at the top of the arc of the housing 24 having a substantially arcuate sectional shape, and the blue light source 14B and the red light source 14R are inserted through the opening 24a. The light source unit 16 is fixed from the outside at the top of the arc of the housing 24.

The light source unit 16 is a known light-emitting device having, in addition to the light sources, a substrate for switching on and controlling the light sources 14 and other members and selected according to the type of the light sources 14.

The light source unit 16 may be attached to the housing 24 by any method, and various known methods can be used according to, for example, the shape and configuration of the housing 24 and the light source unit 16. The light source unit 16 may be detachably attached to the housing 24.

The light source unit 16 has a plurality of the blue light sources 14B and the red light sources 14R arranged in a single direction, and each light source may be, but need not be, detachable from the light source unit 16 and replaceable.

The plant growth lighting fixture according to the present invention has, as light sources, two or more of a blue light source having an emission center wavelength in a wavelength range of blue light, that is, a blue wavelength range (380 to 500 nm), a green light source having an emission center wavelength in a wavelength range of green light, that is, a green wavelength range (more than 500 nm and less than 600 nm), and a red light source having an emission center wavelength in a wavelength range of red light, that is, a red wavelength range (600 to 780 nm).

The emission center wavelength of a light source, that is, the center wavelength of the light source, is a wavelength at which the emission of the light source is maximum, that is, a wavelength at the maximum peak of the emission spectral characteristics of the light source.

In the plant growth lighting fixture according to present invention, which of the blue light source, the green light source, and the red light source is used may be appropriately selected according to the wavelength that can promote the growth of a plant to be cultivated.

Here, irradiation with red light and irradiation with blue light are suitable for the promotion of growth (weight increase) of plants. That is to say, the growth of many plants is promoted by irradiation with blue right-handed or left-handed circularly polarized light or irradiation with red right-handed or left-handed circularly polarized light.

Accordingly, in the plant growth lighting fixture 10 in the illustrated example, the blue light source 14B having a center wavelength in the wavelength range of blue light and the red light source 14R having a center wavelength in the wavelength range of red light are used as a preferred embodiment.

However, in the plant growth lighting fixture according to present invention, the light sources are not limited to the blue light source 14B and the red light source 14R.

That is to say, in the plant growth lighting fixture according to the present invention, the blue light source and the green light source, the green light source and the red light source, or the blue light source, the green light source, and the red light source may be used as the light sources.

Furthermore, in the plant growth lighting fixture according to the present invention, a light source having an emission center in the invisible light range, for example, an infrared light source having a center wavelength in the infrared wavelength range may optionally be used in addition to two or more of the blue light source, the green light source, and the red light source. In the plant growth lighting fixture, a combination of any two of the blue light source, the green light source, and the red light source and a light source having an emission center in the invisible light range can also be used.

The light sources are not limited, and any type of light source (light-emitting device) can be used as long as it can emit light with a wavelength at which the growth of a target plant for the plant growth lighting fixture 10 can be controlled.

Examples of light sources include fluorescent lamps such as fluorescent light, LEDs, discharge lamps such as mercury lamps, and halogen lamps, tungsten lamps, laser lights, organic light-emitting diodes (OLEDs), metal halide lamps, and xenon lamps. Of these, LEDs are preferred from the viewpoint of efficiency.

These light sources can be used in combination with filters that reflect or transmit light in a particular wavelength range and/or phosphors that convert wavelength.

The plant growth lighting fixture 10 according to the present invention preferably further has, in addition to any two of the blue light source, the green light source, and the red light source for emitting light that promotes plant growth, for example, the blue light source 14B and the red light source 14R, an auxiliary light source for emitting white light. The auxiliary light source preferably emits white light, which is lower in intensity than light from the blue light source, the green light source, or the red light source.

When the plant growth lighting fixture 10 has the auxiliary light source for emitting low-intensity white light in addition to the light sources 14 for the promotion of plant growth, the visibility in a work environment of plant cultivation workers can be increased to improve, for example, observability of plants and workability.

The auxiliary light source is not limited, and known so-called white light sources such as fluorescent lamps, mercury lamps, halogen lamps, and metal halide lamps can be used. Alternatively, white light may be emitted by combining the light sources for promoting plant growth with the auxiliary light source. For example, when the blue light source 14B and the red light source 14R are used as the light sources for promoting plant growth as in the plant growth lighting fixture 10 in the illustrated example, the green light source lower in intensity and/or smaller in number than the blue light source 14B and the red light source 14R may be used in combination as the auxiliary light source so that white light for work, which is lower in intensity than red light and blue light, is emitted.

In the plant growth lighting fixture 10 in the illustrated example, a plurality of the blue light sources 14B and a plurality of the red light sources 14R are alternately arranged along the longitudinal direction of the housing 24 as a preferred embodiment. This configuration enables the promotion of plant growth over a large area.

The blue light source 14B and the red light source 14R need not necessarily be alternately arranged one by one. When the red light source 14R is denoted by R, and the blue light source 14B is denoted by B, the light sources may be arranged, for example, in a configuration in which two or more and two or more are alternately arranged, such as a configuration in which two and two are alternately arranged like RRBBRRBBRR . . . or a configuration in which three and three are alternately arranged like RRRBBBRRRBBB . . . .

When the plant growth lighting fixture 10 has a plurality of the blue light sources 14B and a plurality of the red light sources 14R, the number of the blue light sources 14B and the number of the red light sources 14R may be the same or different.

The above also applies to the case where the plant growth lighting fixture 10 has three (or more) types of light sources.

When a plurality of light sources are arranged, the arrangement of the light sources need not be a linear arrangement and may be a staggered arrangement, a sine-curve arrangement, or any other arrangement. That is to say, when a plurality of the light sources 14 are arranged in the plant growth lighting fixture according to present invention, the light sources may be arranged in any configuration as long as they are arranged in a single direction.

Furthermore, light sources of different colors may be arranged in different lines, such as a line of the blue light sources 14B and a line of the red light sources 14R.

In the plant growth lighting fixture 10, the number and the arrangement interval of the blue light sources 14B and the red light sources 14R are not limited and may be appropriately set according to, for example, the type, light intensity, and light diffusibility of the light sources, the length of the plant growth lighting fixture 10, and the type of plant to be cultivated.

Also when the housing 24 is not elongated, the plant growth lighting fixture according to the present invention may have a plurality of the blue light sources 14B and/or a plurality of the red light sources 14R.

Reflective-Type Circularly Polarizing Plate

The reflective-type circularly polarizing plate 18, in response to two or more of blue light, green light, and red light, selectively reflects right-handed circularly polarized light or left-handed circularly polarized light and transmits the other light.

Figure 3:
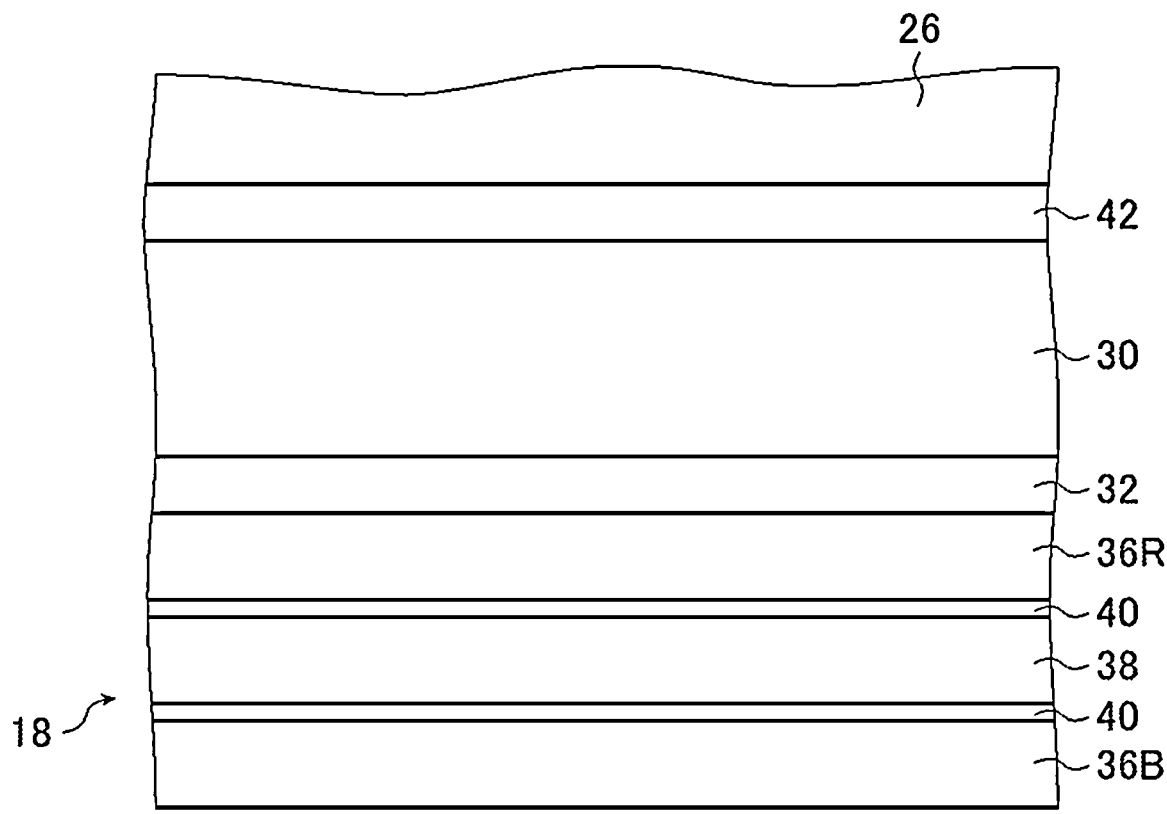
FIG. 3 conceptually illustrates an example of a reflective-type circularly polarizing plate used for a plant growth lighting fixture according to the present invention.

FIG. 3 conceptually illustrates the reflective-type circularly polarizing plate 18.

The reflective-type circularly polarizing plate 18 has a support 30, an alignment film 32, a red-reflecting cholesteric liquid crystal layer 36R, an adhesive layer 40, a polarization correction layer 38, another adhesive layer 40, and a blue-reflecting cholesteric liquid crystal layer 36B.

The reflective-type circularly polarizing plate 18 is, for example, disposed so as to cover the whole surface of the light-transmitting plate 26 of the lighting fixture main body 12, that is, the whole light exit surface of the lighting fixture main body 12.

As will be described later, the reflective-type circularly polarizing plate 18 is bonded to the light-transmitting plate 26 of the lighting fixture main body 12 with an adhesive layer 42 interposed therebetween.

In the reflective-type circularly polarizing plate 18, the support 30 is a plate member that supports the alignment film 32, the red-reflecting cholesteric liquid crystal layer 36R, the adhesive layer 40, the polarization correction layer 38, the other adhesive layer 40, and the blue-reflecting cholesteric liquid crystal layer 36B.

The support 30 may be a plate member made of any type of material that can transmit light emitted from the blue light source 14B and the red light source 14R at a sufficient transmittance. Examples of materials for forming the support 30 include PET, PC, polyethylene, polypropylene, various acrylic resins, triacetyl cellulose (TAC), cycloolefin polymers (COPs), and cycloolefin copolymers (COCs).

The support 30 may have flexibility or may have sufficient rigidity without having flexibility.

For example, when the reflective-type circularly polarizing plate 18 is releasably affixed to the light-transmitting plate 26 with a tacky layer interposed therebetween as described later, it is preferable to use the support 30 having flexibility so that the reflective-type circularly polarizing plate 18 has flexibility. When the reflective-type circularly polarizing plate 18 is made detachable from the light-transmitting plate 26 (the lighting fixture main body 12) by using, for example, grooves for insertion of end portions of the reflective-type circularly polarizing plate as described later, the support 30 preferably has sufficient rigidity so that the shape of the reflective-type circularly polarizing plate 18 can be maintained.

Thus, the thickness of the support 30 may be appropriately set to satisfy required properties according to, for example, the preferred thickness of the reflective-type circularly polarizing plate 18, the material for forming the support 30, the properties, such as flexibility and rigidity, that the reflective-type circularly polarizing plate 18 is required to have, and the configuration of the plant growth lighting fixture 10.

In the reflective-type circularly polarizing plate 18, the support 30 is disposed as a preferred embodiment.

Thus, for example, when sufficient mechanical strength is provided only by the red-reflecting cholesteric liquid crystal layer 36R, the adhesive layer 40, the polarization correction layer 38, the other adhesive layer 40, and the blue-reflecting cholesteric liquid crystal layer 36B, when the alignment film 32 is affixed to the light-transmitting plate 26 with the adhesive layer 42 interposed therebetween, and when the alignment film 32 described below can act as a support, the reflective-type circularly polarizing plate 18 need not necessarily have the support 30.

The alignment film 32 is disposed on the surface of the support 30.

The alignment film 32 is a layer for bringing a liquid crystal compound forming the red-reflecting cholesteric liquid crystal layer 36R into a predetermined alignment state.

The alignment film 32 may be any known alignment film that can align a liquid crystal compound.

For example, the alignment film 32 may be formed by forming a resin layer made of, for example, polyimide, polyvinyl alcohol, polyester, polyacrylate, polymethacrylate, polyarylate, polyamide-imide, polyetherimide, polyamide, or modified polyamide on the surface of the support 30 and subjecting the resin layer to rubbing treatment.

Alternatively, an alignment film formed by oblique deposition of an inorganic compound, an alignment film formed by formation of a layer having microgrooves, or an alignment film formed by accumulation of an organic compound (e.g., w-tricosanoic acid, dioctadecylmethylammonium chloride, or methyl stearate) using the Langmuir-Blodgett technique (LB film) can also be used. An alignment film that exhibits an alignment function upon application of an electric or magnetic field or irradiation with light can also be used.

Of these, the alignment film 32 formed by subjecting to a resin layer to rubbing treatment is particularly preferred. The rubbing treatment can be performed by rubbing the surface of the resin layer with paper and/or cloth several times in a predetermined direction.

Alternatively, the support 30 itself may be subjected to rubbing treatment or the like and used as an alignment film.

In the reflective-type circularly polarizing plate 18, the red-reflecting cholesteric liquid crystal layer 36R is formed on the surface of the alignment film 32. The polarization correction layer 38 is affixed to the surface of the red-reflecting cholesteric liquid crystal layer 36R with the adhesive layer 40 interposed therebetween. The blue-reflecting cholesteric liquid crystal layer 36B is affixed to the surface of the polarization correction layer 38 with the other adhesive layer 40 interposed therebetween.

The polarization correction layer 38 and the blue-reflecting cholesteric liquid crystal layer 36B affixed to each other with the adhesive layer 40 interposed therebetween may be formed, for example, by release transfer.

Referring, for example, to the blue-reflecting cholesteric liquid crystal layer 36B, the blue-reflecting cholesteric liquid crystal layer 36B is first formed on a surface of an appropriately selected substrate. An alignment film as described above is optionally formed in advance on the surface of the substrate. The substrate may be, for example, a resin film such as a PET film.

Next, an uncured adhesive layer 40 is formed on a surface of the polarization correction layer 38 and/or the surface of the blue-reflecting cholesteric liquid crystal layer 36B, and the polarization correction layer 38 and the blue-reflecting cholesteric liquid crystal layer 36B are affixed to each other with the uncured adhesive layer 40 interposed therebetween.

After this, the adhesive layer 40 is cured, and then the substrate, or the substrate and the alignment film are peeled off to form the blue-reflecting cholesteric liquid crystal layer 36B on the surface of the polarization correction layer 38.

The polarization correction layer 38 can also be formed basically by the same release transfer.

When a polarization correction layer 38 in the form of a sheet, such as a commercially available product, is used, the polarization correction layer 38 may be formed on the surface of the red-reflecting cholesteric liquid crystal layer 36R not by the release transfer but by disposing the adhesive layer 40 on the red-reflecting cholesteric liquid crystal layer 36R and/or the polarization correction layer 38 and affixing the polarization correction layer 38 in the form of a sheet to the red-reflecting cholesteric liquid crystal layer 36R.

The adhesive layer 40 is not limited, and any known adhesive that has sufficient transparency to blue light and red light can be used.

Examples of adhesives usable for the adhesive layer 40 include various known adhesives such as silicone adhesives, acrylic adhesives, natural rubber adhesives, synthetic rubber adhesives, cycloolefin resin adhesives, urethane adhesives, and epoxy adhesives, which are used to bond various sheet-like materials used in optical applications, such as protective films (protective sheets), gas barrier films, and optical films, to target places.

Here, in the plant growth lighting fixture 10, light to be transmitted through the adhesive layer 40 is light transmitted through the red-reflecting cholesteric liquid crystal layer 36R, as illustrated in FIG. 1 to FIG. 3. That is to say, red light to be transmitted through the adhesive layer 40 is composed only of right-handed circularly polarized light or left-handed circularly polarized light transmitted through the red-reflecting cholesteric liquid crystal layer 36R.

Thus, if the adhesive layer 40 has a large in-plane retardation Re, the degree of circular polarization of red light transmitted through the red-reflecting cholesteric liquid crystal layer 36R may decrease, thus reducing the plant growth promoting effect.

In view of this, it is preferable to use, for the adhesive layer 40, an adhesive having a small in-plane retardation Re, such as an optical clear adhesive (OCA).

Specifically, the adhesive layer 40 has an in-plane retardation Re (550) at 550 nm of preferably 50 nm or less, more preferably 10 nm or less.

The thickness of the adhesive layer 40 is not limited, and a thickness that can provide sufficient adhesion may be appropriately set according to the type of adhesive for forming the adhesive layer 40.

The thickness of the adhesive layer 40 is preferably 1 to 100 μm, more preferably 10 to 30 μm.

In the plant growth lighting fixture 10 according to the present invention, the layer configuration of the reflective-type circularly polarizing plate 18 is not limited to the configuration shown in FIG. 3.

That is to say, when the polarization correction layer 38 can be formed directly on the surface of the red-reflecting cholesteric liquid crystal layer 36R, the polarization correction layer 38 may be formed directly on the red-reflecting cholesteric liquid crystal layer 36R without using the adhesive layer 40. Likewise, when the blue-reflecting cholesteric liquid crystal layer 36B can be formed directly on the polarization correction layer 38 or the alignment film disposed on the polarization correction layer 38, the blue-reflecting cholesteric liquid crystal layer 36B may be formed directly on the polarization correction layer 38 without using the adhesive layer 40.

As described above, the red-reflecting cholesteric liquid crystal layer 36R is disposed on the surface of the alignment film 32, the polarization correction layer 38 is disposed on the surface of the red-reflecting cholesteric liquid crystal layer 36R through adhesion of the adhesive layer 40, and the blue-reflecting cholesteric liquid crystal layer 36B is disposed on the surface of the polarization correction layer 38 through adhesion of the adhesive layer 40.

The blue-reflecting cholesteric liquid crystal layer 36B and the red-reflecting cholesteric liquid crystal layer 36R are each a cholesteric liquid crystal layer formed by fixing a cholesteric liquid crystalline phase.

As is well known, a cholesteric liquid crystal layer has an effective wavelength range, that is, a selective reflection wavelength range, and selectively reflects right-handed circularly polarized light or left-handed circularly polarized light in the effective wavelength range. Specifically, the cholesteric liquid crystal layer reflects left-handed circularly polarized light in the effective wavelength range and transmits all the other light including right-handed circularly polarized light in the effective wavelength range. Alternatively, the cholesteric liquid crystal layer reflects right-handed circularly polarized light in the effective wavelength range and transmits all the other light including left-handed circularly polarized light in the effective wavelength range.

Thus, of the light transmitted through the cholesteric liquid crystal layer, only the light in the effective wavelength range contains left-handed circularly polarized light or right-handed circularly polarized light. In other words, the light in the effective wavelength range irradiates a plant with right-handed circularly polarized light alone or left-handed circularly polarized light alone.

In the present invention, the light in the effective wavelength range transmitted through the cholesteric liquid crystal layer is not limited to light consisting only of right-handed circularly polarized light or left-handed circularly polarized light.

That is to say, in the present invention, when the cholesteric liquid crystal layer reflects left-handed circularly polarized light in the effective wavelength range and transmits right-handed circularly polarized light, the light in the effective wavelength range transmitted through the cholesteric liquid crystal layer may contain left-handed circularly polarized light. In contrast, when the cholesteric liquid crystal layer reflects right-handed circularly polarized light in the effective wavelength range and transmits left-handed circularly polarized light, the light in the effective wavelength range transmitted through the cholesteric liquid crystal layer may contain right-handed circularly polarized light. In either case, in the effective wavelength range, the proportion of a circularly polarized component having a rotational direction that allows transmission through the cholesteric liquid crystal layer is larger, as a matter of course.

Thus, the plant growth lighting fixture 10 according to the present invention can radiate highly circularly polarized light containing a large proportion of circularly polarized light (circularly polarized component) having a rotational direction that enables the promotion of plant growth in a desired wavelength range that enables the promotion of plant growth, and can suitably promote plant growth.

In other words, the plant growth lighting fixture 10 according to the present invention can irradiate a plant with light containing a large proportion of circularly polarized light having a particular rotational direction that contributes to plant growth in a particular wavelength range that enables the promotion of plant growth.

Here, the polarization state of light can be expressed by the sum of right-handed circularly polarization and left-handed circularly polarization. For example, when the left-handed circularly polarization and the right-handed circularly polarization have the same intensity, the sum is linear polarization, with its electric vector oscillating in the orientation determined by the phase difference between the left-handed circularly polarization and the right-handed circularly polarization. When the right-handed circularly polarization and the left-handed circularly polarization have different intensities, the resulting state is elliptic polarization. When there is only one of the two components, the resulting state is perfect circular polarization.

The rotational direction (sense) of circular polarization, as viewed such that light travels toward the viewer, is right-handed if the head of the electric field vector rotates clockwise with increasing time, and is left-handed if the head of the electric field vector rotates counterclockwise.

The degree of circular polarization is defined as:

$$|I_R - I_L|/(I_R + I_L)$$

where $I_R$ is the intensity of right-handed circularly polarization of light, and $I_L$ is the intensity of left-handed circularly polarization of light. Light having a higher degree of circular polarization contains a higher proportion of right-handed circularly polarized light or left-handed circularly polarized light.

The polarization state of the light emitted from the light sources 14 for each wavelength can be measured with a spectroradiometer or spectrometer equipped with a circularly polarizing plate. In this case, the measured intensity of light transmitted through a right-handed circularly polarizing plate corresponds to $I_R$, and the measured intensity of light transmitted through a left-handed circularly polarizing plate corresponds to $I_L$. Normal light sources such as incandescent lamps, mercury lamps, fluorescent lamps, and LEDs emit almost natural light. The polarization characteristics of natural light transmitted through the reflective-type circularly polarizing plate 18 and natural light reflected by the reflective-type circularly polarizing plate 18 can be measured, for example, with AxoScan mentioned above.

The degree of circular polarization may be measured using a commercially available spectrophotometer (e.g., USB4000 manufactured by Ocean Optics, Inc.). In this case, for example, the degree of circular polarization may be determined in the following manner: the reflective-type circularly polarizing plate 18 is mounted on the spectrophotometer, the intensity of right-handed circularly polarized light and left-handed circularly polarization was measured several times with varying angles of incidence, and the degree of circular polarization is calculated by the above formula using the average of the measurements.

The blue-reflecting cholesteric liquid crystal layer 36B has a center wavelength of an effective wavelength range (selective reflection center wavelength) in the blue wavelength range.

Specifically, the blue-reflecting cholesteric liquid crystal layer 36B reflects blue left-handed circularly polarized light and transmits basically all the other light including blue right-handed circularly polarized light. Alternatively, the blue-reflecting cholesteric liquid crystal layer 36B reflects blue right-handed circularly polarized light and transmits basically all the other light including blue left-handed circularly polarized light.

The red-reflecting cholesteric liquid crystal layer 36R has a center wavelength of an effective wavelength range in the red wavelength range.

Specifically, the red-reflecting cholesteric liquid crystal layer 36R reflects red left-handed circularly polarized light and transmits basically all the other light including red right-handed circularly polarized light. Alternatively, the red-reflecting cholesteric liquid crystal layer 36R reflects red right-handed circularly polarized light and transmits basically all the other light including red left-handed circularly polarized light.

The light transmitted through the cholesteric liquid crystal layer excludes inevitably absorbed components.

The cholesteric liquid crystal layer, which is a layer formed by fixing a cholesteric liquid crystalline phase, has an effective wavelength range. That is to say, the cholesteric liquid crystal layer exhibits selective reflection properties of reflecting particular circularly polarized light in the effective wavelength range.

Examples of liquid crystalline phases that exhibit selective reflection in the effective wavelength range include cholesteric liquid crystalline phases and chiral smectic liquid crystalline phases, both of which have a helical structure. A liquid crystal material that exhibits a cholesteric liquid crystalline phase or a chiral smectic liquid crystalline phase can be formed by mixing an achiral liquid crystal compound with a chiral agent. Alternatively, such a liquid crystal material can also be obtained by copolymerizing these compounds into a polymer liquid crystal or a polymer film.

The selective reflection properties of the cholesteric liquid crystal layer, that is, the effective-wavelength-range center wavelength $\lambda$, depend on the pitch length P (=helical period) of the helical structure of the cholesteric or chiral smectic phase and follows the relationship $\lambda = n \times P$, where n is the average refractive index of the cholesteric liquid crystalline phase. Thus, the effective-wavelength-range center wavelength $\lambda$ can be adjusted by adjusting the pitch length P of the helical structure of the cholesteric liquid crystalline phase. Since the pitch length P depends on the type and/or concentration of the chiral agent added to the liquid crystal composition, these can be adjusted to achieve the desired pitch length P.

The half-width $\Delta\lambda$ (i.e., the half transmittance $T_{1/2}$) of the effective wavelength range depends on the birefringence $\Delta n$ of the liquid crystal compound and the pitch length P of the helical structure and follows the relationship $\Delta\lambda = \Delta n \times P$. Thus, the width of the effective wavelength range can be controlled by adjusting $\Delta n$. The adjustment of $\Delta n$ can be performed by adjusting the type of liquid crystal and its mixing ratio or controlling the temperature during alignment fixation. Alternative techniques for increasing the width of the effective wavelength range include stacking two or more cholesteric liquid crystal layers such that the pitch lengths P thereof are shifted from each other and varying the pitch in the thickness direction of the cholesteric liquid crystal layer.

The circularly polarized light selective reflection of the cholesteric liquid crystal layer depends on the twisted direction (sense) of the helix of the cholesteric liquid crystalline phase. That is to say, when the twisted direction of the helix of the cholesteric liquid crystalline phase is right-handed, the cholesteric liquid crystal layer reflects right-handed circularly polarized light and transmits left-handed circularly polarized light in the effective wavelength range. In contrast, when the twisted direction of the helix of the cholesteric liquid crystalline phase is left-handed, the cholesteric liquid crystal layer reflects left-handed circularly polarized light and transmits right-handed circularly polarized light in the effective wavelength range.

Thus, when irradiation is performed with left-handed circularly polarized light and not with right-handed circularly polarized light in the effective wavelength range, that is, the wavelength range where plant growth is promoted, a cholesteric liquid crystal layer that has a right-twisted helix and reflects right-handed circularly polarized light is used. When irradiation is performed with right-handed circularly polarized light and not with left-handed circularly polarized light, a cholesteric liquid crystal layer that has a left-twisted helix and reflects left-handed circularly polarized light is used for the reflective-type circularly polarizing plate 18.

The twisted direction of the helix of the cholesteric liquid crystalline phase can be adjusted by the type of liquid crystal compound forming the cholesteric liquid crystal layer and/or the type of chiral agent added.

Hereinafter, constituent materials of the cholesteric liquid crystal layer and a method for forming the cholesteric liquid crystal layer will be described.

The cholesteric liquid crystal layer formed by fixing a cholesteric liquid crystalline phase can be formed using a cholesteric liquid crystal composition prepared by dissolving (dispersing), in a solvent, a liquid crystal compound, a chiral agent, other additives that are optionally added (e.g., air interface alignment control agents, polymerization initiators, crosslinking agents, and surfactants), and other optional constituents.

Liquid Crystal Compound

Preferred liquid crystal compounds used to form the cholesteric liquid crystal layer include low-molecular-weight liquid crystal compounds and polymer liquid crystal compounds. More preferred are low-molecular-weight liquid crystal compounds, which require a shorter alignment time and have a higher alignment evenness.

The liquid crystal compound preferably has a polymerizable group. More preferably, the liquid crystal compound exhibits a nematic phase or a chiral smectic phase. The molecular shape is preferably disk-like or rod-like. Rod-like molecules are more preferred from the viewpoint of productivity, whereas disk-like molecules are more preferred when it is important to reduce the angular dependence of the width of selective reflection.

Suitable liquid crystal compounds include rod-like nematic liquid crystal compounds having a polymerizable group or having no polymerizable group. Rod-like nematic liquid crystal compounds having no polymerizable group are described in various documents (e.g., Y. Goto et. al., Mol. Cryst. Liq. Cryst. 1995, Vol. 260, pp. 23-28).

Suitable disk-like compounds having a polymerizable group include the compounds described in JP1996-27284A (JP-H8-27284A), JP2001-100028A, and JP2006-76992A.

The combined use of two or more polymerizable nematic liquid crystal compounds inhibits crystal precipitation during coating and alignment and decreases the alignment temperature.

The polymerizable group may be introduced into the liquid crystal compound in any known manner. The polymerizable group is not particularly limited and can be appropriately selected according to the purpose. Examples include unsaturated polymerizable groups, an epoxy group, a thioepoxy groups, an oxetane group, a thietanyl group, an aziridinyl group, a pyrrole group, a fumarate group, a cinnamoyl group, an isocyanate group, an isothiocyanate group, an amino group, a hydroxyl group, a carboxyl group, an alkoxysilyl group, a mercapto group, a vinyl group, an allyl group, a methacryloyl group, and an acryloyl group.

For example, when the liquid crystal compound is a polymerizable nematic liquid crystal compound, the polymerizable group is preferably at least one of an unsaturated polymerizable group, an epoxy group, or an aziridinyl group, more preferably an unsaturated polymerizable group, particularly preferably an ethylenically unsaturated polymerizable group.

These polymerizable groups may be used alone or in combination of two or more.

Chiral Agent

The chiral agent (chiral compound (optically active compound)) used for the cholesteric liquid crystal composition may be any known chiral agent. For example, compounds described in "Liquid Crystal Device Handbook, Chapter 3, Section 4-3, Chiral Agents for TN and STN, p. 199, edited by the 142nd Committee of the Japan Society for the Promotion of Science, 1989", isosorbide derivative, and isomannide derivative can be used.

While chiral agents typically include an asymmetric carbon atom, axially chiral compounds and planarly chiral compounds, which include no asymmetric carbon atom, can also be used.

Examples of axially chiral compounds and planarly chiral compounds include binaphthyls, helicenes, paracyclophanes, and derivatives thereof.

The chiral compound for inducing a helical structure in the cholesteric liquid crystalline phase is preferably selected according to the purpose since the helical sense or helical pitch to be induced varies depending on the compound. The sense and pitch of a helix can be measured by using methods described in "Ekisho Kagaku Jikken Nyumon (Introduction to Experimental Liquid Crystal Science", edited by The Japanese Liquid Crystal Society, published by Sigma Publishing, 2007, p. 46 and "Ekisho Binran (Liquid Crystal Handbook)", the Editorial Committee of Ekisho Binran, Maruzen, p. 196.

The chiral agent may have a polymerizable group.

When the chiral agent has a polymerizable group, for example, a polymer having a nematic liquid crystal repeating unit and an optically active structure can be formed by the polymerization reaction of a polymerizable nematic liquid crystal compound.

The polymerizable group of the chiral agent is preferably a group similar to the polymerizable group of the liquid crystal compound. Thus, when the liquid crystal compound is a polymerizable nematic liquid crystal compound, the polymerizable group of the chiral agent is also preferably at least one selected from the group consisting of unsaturated polymerizable groups, an epoxy group, and an aziridinyl group, more preferably an unsaturated polymerizable group, particular preferably an ethylenically unsaturated polymerizable group.

The chiral agent may also have a photoisomerizable group.

When the chiral agent has a photoisomerizable group, a pattern of the desired reflection wavelength corresponding to the emission wavelength of the light sources 14 can be advantageously formed by irradiation with, for example, active radiation through a photomask after coating and alignment. Preferred photoisomerizable groups include isomerizable moieties of photochromic compounds, an azo group, an azoxy group, and a cinnamoyl group. Specific compounds include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent based on the liquid crystal compound is preferably 0.01 to 200 mol %, more preferably 1 to 30 mol %.

Polymerization Initiator

It is preferable to add a polymerization initiator for a polymerization reaction to the cholesteric liquid crystal composition. Polymerization reactions include thermal polymerization reactions with thermal polymerization initiators and photopolymerization reactions with photopolymerization initiators. Of these, photopolymerization reactions with photopolymerization initiators are particularly preferred.

The photopolymerization initiator is not particularly limited and can be appropriately selected according to the purpose. Examples include α-carbonyl compounds, acyloin ethers, α-hydrocarbon-substituted aromatic acyloin compounds, polynuclear quinone compounds, combinations of triarylimidazole dimers and p-aminophenyl ketones, oxadiazole compounds, halomethylated triazine derivatives, halomethylated oxadiazole derivatives, imidazole derivatives, anthraquinone derivatives, benzanthrone derivatives, benzophenone derivatives, thioxanthone derivatives, acridine derivatives, phenazine derivatives, and oxime derivatives.

The content of the photopolymerization initiator based on the solids content of the cholesteric liquid crystal composition is preferably 0.01 to 20 mass %, more preferably 0.5 to 5 mass %.

Crosslinking Agent

The cholesteric liquid crystal composition may optionally contain a crosslinking agent to achieve improved film hardness and durability after curing. Crosslinking agents that cure with, for example, ultraviolet light, heat, or moisture are suitable for use.

The crosslinking agent is not particularly limited and can be appropriately selected according to the purpose. Examples include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol-tris [3-(1-aziridinyl)propionate] and 4,4-bis(ethyleneiminocarbonylamino)diphenylmethane; isocyanate compounds such as hexamethylene diisocyanate and biuret-type isocyanates; polyoxazoline compounds having oxazoline side groups; and alkoxysilane compounds such as vinyltrimethoxysilane and N-(2-aminoethyl)-3-aminopropyltrimethoxysilane. Known catalysts may also be used depending on the reactivity of the crosslinking agent to achieve improved productivity in addition to improved film hardness and durability. These crosslinking agents may be used alone or in combination of two or more.

The content of the crosslinking agent is preferably 3 to 20 mass %, more preferably 5 to 15 mass %. When the content of the crosslinking agent is 3 mass % or more, the crosslink density improving effect can be sufficiently produced, and when the content of the crosslinking agent is 20 mass % or less, the stability of the cholesteric liquid crystal layer can be secured.

Air Interface Alignment Control Agent

An air interface alignment control agent, which contributes to stable or quick formation of a planarly aligned cholesteric liquid crystal layer, may be added to the cholesteric liquid crystal composition.

Examples of air interface alignment control agents include fluorine-containing (meth)acrylate polymers and below-described compounds represented by general formula (1). Two or more air interface alignment control agents selected from the group consisting of these compounds may be contained.

These air interface alignment control agents reduce the tilt angle of the liquid crystal compound molecules at the air interface of the cholesteric liquid crystal layer or allow them to be substantially horizontally aligned. In the present invention, "horizontally aligned" means that the major axes of the liquid crystal molecules are parallel to the film plane; however, they need not be exactly parallel. In the present invention, this phrase means that the liquid crystal molecules are aligned at a tilt angle of less than 20° with respect to the horizontal plane.

When the liquid crystal compound is horizontally aligned near the air interface, orientation defects are less likely to occur. Thus, the cholesteric liquid crystal layer exhibits high transparency outside the effective wavelength range (selective reflection range) and a high degree of polarization in the effective wavelength range. In contrast, if the liquid crystal compound molecules are aligned at a large tilt angle, the helical axis of the cholesteric liquid crystalline phase would deviate from the normal to the film plane. This is undesirable because the reflectance would decrease, and the degree of polarization would also decrease due to the occurrence of a fingerprint pattern and the resulting increase in haze and diffraction.

Examples of fluorine-containing (meth)acrylate polymers usable as air interface alignment control agents include compounds described in, for example, paragraphs <0018> to <0043> of JP2007-272185A.

As described above, compounds represented by general formula (1) below are also suitable for use as air interface alignment control agents.

Hereinafter, compounds usable as air interface alignment control agents and represented by general formula (1) below will be described.

general formula (1)

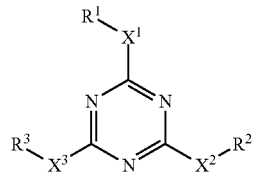

In general formula (1), $R^1$, $R^2$, and $R^3$ each independently represent a hydrogen atom or a substituent, and $X^1$, $X^2$, and $X^3$ each represent a single bond or a divalent linking group. Preferred substituents represented by $R^1$ to $R^3$ are substituted or unsubstituted alkyl groups (in particular, unsubstituted alkyl groups and fluorine-substituted alkyl groups are more preferred), substituted or unsubstituted aryl groups (in particular, aryl groups having fluorine-substituted alkyl groups are preferred), substituted or unsubstituted amino groups, substituted or unsubstituted alkoxy groups, substituted or unsubstituted alkylthio groups, and halogen atoms. The divalent linking groups represented by $X^1$, $X^2$, and $X^3$ are preferably selected from the group consisting of alkylene groups, alkenylene groups, divalent aromatic groups, divalent heterocyclic residues, —CO—, —NRa- (where Ra is an alkyl group having 1 to 5 carbon atoms or a hydrogen atom), —O—, —S—, —SO—, —$SO_2$—, and combinations thereof. More preferred are divalent linking groups selected from the group consisting of alkylene groups, phenylene groups, —CO—, —NRa—, —O—, —S—, and —$SO_2$— and combinations of at least two divalent linking groups selected from this group. The number of carbon atoms in the alkylene groups is preferably 1 to 12. The number of carbon atoms in the alkenylene groups is preferably 2 to 12. The number of carbon atoms in the divalent aromatic groups is preferably 6 to 10.

Examples of compounds represented by general formula (1) and usable as air interface alignment control agents include compounds described in JP2005-99248A. Compounds represented by general formula (1) may be used alone or in combination of two or more as air interface alignment control agents.

The amount of a compound represented by general formula (1) added to the cholesteric liquid crystal composition is preferably 0.01 to 10 mass %, more preferably 0.01 to 5 mass %, particularly preferably 0.02 to 1 mass %, based on the total mass of the cholesteric liquid crystal compound.

Surfactant

As will be described later, the reflective-type circularly polarizing plate 18 having a cholesteric liquid crystal layer is formed by applying to a substrate a cholesteric liquid crystal composition containing a polymerization initiator and a polymerizable liquid crystal compound, drying the coating, and polymerizing (crosslinking or curing) the liquid crystal compound.

Here, to adjust the surface tension of the coating obtained by applying the cholesteric liquid crystal composition to the substrate to achieve uniform thickness, the cholesteric liquid crystal composition preferably contains a surfactant.

A surfactant that does not interfere with alignment can be appropriately selected and used.

Examples of suitable surfactants that can be used include nonionic surfactants containing a siloxane group and/or a fluoroalkyl group as a hydrophobic moiety. Particularly suitable are oligomers having two or more hydrophobic moieties per molecule.

Commercially available surfactants may also be used. Examples of commercially available surfactants include PolyFox PF-151N, PF-636, PF-6320, PF-656, PF-6520, PF-3320, PF-651, and PF-652 available from OMNOVA Solutions Inc.; FTERGENT FTX-209F, FTX-208G, and FTX-204D available from NEOS Company Limited; and SURFLON KH-40 available from Seimi Chemical Co., Ltd. Also suitable are fluorinated compounds described in paragraph <0087> of JP2002-341126A and fluorinated compounds described in paragraphs <0064> to <0080> and paragraphs <0092> to <0096> of JP2005-99248A.

The content of the surfactant is preferably 0.01 to 1 mass % of the solids content of the cholesteric liquid crystal composition. If the content of the surfactant is less than 0.01 mass %, orientation defects may occur since the surface tension at the air interface does not decrease sufficiently. If the content of the surfactant is more than 1 mass %, excess surfactant may form an uneven structure on the air interface side, thus decreasing the alignment evenness.

Solvent

The solvent used for the preparation of the cholesteric liquid crystal composition is not particularly limited and can be appropriately selected according to the purpose, and an organic solvent is preferably used.

The organic solvent is not particularly limited and can be appropriately selected according to the purpose. Examples include ketones, alkyl halides, amides, sulfoxides, heterocyclic compounds, hydrocarbons, esters, and ethers. These may be used alone or in combination of two or more. Of these, ketones are particularly preferred in view of environmental impact.

As described above, the cholesteric liquid crystal layer can be formed using a cholesteric liquid crystal composition prepared by dissolving, for example, a liquid crystal compound, a chiral agent, and a polymerization initiator in a solvent.

For example, a cholesteric liquid crystal layer with fixed cholesteric regularity (cholesteric phase) can be formed by preparing a cholesteric liquid crystal composition, applying the cholesteric liquid crystal composition to an alignment film on the support 30 (layer forming surface), drying the cholesteric liquid crystal composition to obtain a coating, optionally drying the coating, then aligning the liquid crystal compound, and irradiating the coating having the liquid crystal compound aligned therein with active radiation to polymerize the liquid crystal compound.

A laminated film composed of a plurality of cholesteric liquid crystal layers can be formed by repeating the process of producing a cholesteric liquid crystal layer.

The alignment film may be formed on the surface of the support 30 by a known method using the above-described materials.

The method of applying the cholesteric liquid crystal composition to the alignment film is not particularly limited and can be appropriately selected according to the purpose. Examples of the method include curtain coating, extrusion coating, direct gravure coating, die coating, spin coating, dip coating, spray coating, and slide coating. Alternatively, a cholesteric liquid crystal composition applied to a support may be transferred to the alignment film.

After the application of the cholesteric liquid crystal composition, the applied cholesteric liquid crystal composition is heated to align the liquid crystal compound. The heating temperature is preferably 200° C. or lower, more preferably 130° C. or lower. This alignment treatment provides an optical thin film in which a liquid crystal compound such as a polymerizable nematic liquid crystal compound is twistedly aligned so as to have a helical axis in a direction substantially perpendicular to the plane of the optical thin film.

As described above, after the liquid crystal compound is aligned, the liquid crystal composition is polymerized.

The polymerization may be performed by a known method such as thermal polymerization or photopolymerization, depending on the liquid crystal compound. Photopolymerization with light irradiation is preferred to thermal polymerization. The light irradiation is preferably performed using ultraviolet light. The irradiation energy is preferably 20 mJ/$cm^2$ to 50 J/$cm^2$, more preferably 100 mJ/$cm^2$ to 1,500 mJ/$cm^2$. To promote the photopolymerization reaction, the light irradiation may be performed under heating conditions or in a nitrogen atmosphere. The ultraviolet light used for irradiation preferably has a wavelength of 350 to 430 nm. A higher degree of polymerization reaction is preferred from the viewpoint of stability. The degree of polymerization reaction is preferably 70% or more, more preferably 80% or more.

The degree of polymerization reaction can be determined from the proportion of consumed polymerizable functional groups using an infrared (IR) absorption spectrum.

The thickness of the cholesteric liquid crystal layer is not limited, and is preferably 0.1 to 50 µm, more preferably 0.5 to 10 µm, still more preferably 1.5 to 7 µm.

In the plant growth lighting fixture 10 according to the present invention, the presence of a cholesteric liquid crystal layer in the reflective-type circularly polarizing plate 18 allows light emitted from the blue light source 14B and the red light source 14R to be effectively used without waste.

When circularly polarized light is reflected from an ordinary reflective surface, the rotational direction (sense) is reversed. That is to say, when right-handed circularly polarized light is reflected, it converts into left-handed circularly polarized light, and when left-handed circularly polarized light is reflected, it converts into right-handed circularly polarized light. Thus, if light emitted from the blue light source 14B and the red light source 14R has a rotational direction that causes reflection when incident on the cholesteric liquid crystal layer, the rotational direction is reversed upon reflection from the inner surface of the housing 24 and eventually becomes a rotational direction that allows transmission through the cholesteric liquid crystal layer, as a result of which the light enters and passes through the cholesteric liquid crystal layer. Consequently, the reflective-type circularly polarizing plate 18 having the cholesteric liquid crystal layer allows the light emitted from the blue light source 14B and the red light source 14R to be effectively used without waste.

In the plant growth lighting fixture according to present invention, the reflective-type circularly polarizing plate has two or more cholesteric liquid crystal layers selected from the group consisting of a blue-reflecting cholesteric liquid crystal layer, a green-reflecting cholesteric liquid crystal layer, and a red-reflecting cholesteric liquid crystal layer.

The blue-reflecting cholesteric liquid crystal layer is a cholesteric liquid crystal layer having a center wavelength of an effective wavelength range in the blue wavelength range. The green-reflecting cholesteric liquid crystal layer is a cholesteric liquid crystal layer having a center wavelength of an effective wavelength range in the green wavelength range. The red-reflecting cholesteric liquid crystal layer is a cholesteric liquid crystal layer having a center wavelength of an effective wavelength range in the red wavelength range.

As described above, irradiation with red light and irradiation with blue light are suitable for the promotion of growth (weight increase) of plants. Thus, for the promotion of plant growth, irradiation with red right-handed circularly polarized light or left-handed circularly polarized light or irradiation with blue right-handed circularly polarized light or left-handed circularly polarized light are preferred.

Accordingly, the plant growth lighting fixture 10 in the illustrated example has, as a preferred embodiment, the blue light source 14B and the red light source 14R as light sources.

On the other hand, in the plant growth lighting fixture according to the present invention, the wavelength ranges in which the center wavelengths of the light sources are present and the wavelength ranges in which the effective-wavelength-range center wavelengths of the cholesteric liquid crystal layers of the reflective-type circularly polarizing plate are present are wavelength ranges of the same colors.

Accordingly, the plant growth lighting fixture 10 in the illustrated example has, as a preferred embodiment, the blue-reflecting cholesteric liquid crystal layer 36B having a center wavelength of an effective wavelength range in the blue wavelength range and the red-reflecting cholesteric liquid crystal layer 36R having a center wavelength of an effective wavelength range in the red wavelength range.

The effective-wavelength-range center wavelength of the cholesteric liquid crystal layer is a wavelength at which the reflectance of right-handed circularly polarized light or left-handed circularly polarized light is highest in the effective wavelength range, that is, a wavelength at which the transmittance of right-handed circularly polarized light or left-handed circularly polarized light is lowest in the effective wavelength range.

The effective wavelength range of the cholesteric liquid crystal layer, that is, the reflective-type circularly polarizing plate 18, can be measured, for example, with AxoScan mentioned above.

Here, to suitably promote plant growth, it is preferable to select a light source having a center wavelength that is most effective for plant growth.

Thus, it is preferred that the effective-wavelength-range center wavelength of the cholesteric liquid crystal layer match the center wavelength of the light source so that the reflective-type circularly polarizing plate 18 most properly reflects left-handed circularly polarized light or right-handed circularly polarized light and transmits the other circularly polarized component at the center wavelength of the light source.

The plant growth lighting fixture according to the present invention has two or more of a blue light source, a green light source, and a red light source and two or more of a blue-reflecting cholesteric liquid crystal layer, a green-reflecting cholesteric liquid crystal layer, and a red-reflecting cholesteric liquid crystal layer, and the wavelength ranges in which the center wavelengths of the light sources are present and the wavelength ranges in which the effective-wavelength-range center wavelengths of the cholesteric liquid crystal layers are present are wavelength ranges of the same colors.

The plant growth lighting fixture 10 in the illustrated example has the blue light source 14B and the red light source 14R, and the blue-reflecting cholesteric liquid crystal layer 36B and the red-reflecting cholesteric liquid crystal layer 36R.

This configuration enables the plant growth lighting fixture according to the present invention alone to grow plants whose growth can be promoted with light of different colors.

A plant growth lighting fixture having a light source and a reflective-type circularly polarizing plate as described in, for example, JP2012-226229A can promote plant growth by irradiating a plant with circularly polarized light having a wavelength (color) and a rotational direction that enable the promotion of plant growth.

Here, the variety of plants is wide. Thus, wavelength ranges of light that enable growth promotion vary. For example, the growth of some plants is promoted by red light, and the growth of other plants is promoted by blue light. In addition, the growth of some plants is promoted by right-handed circularly polarized light of a particular color, and the growth of other plants is promoted by left-handed circularly polarized light of the particular color.

Plant growth lighting fixtures of the related art do not consider these points and thus are not usable for the growth promotion of plants whose growth can be promoted by circularly polarized light of different colors. Thus, when circularly polarized light that promotes the growth of a plant to be cultivated cannot be radiated, the plant growth lighting fixture needs to be replaced.

In contrast, the plant growth lighting fixture 10 according to the present invention has a plurality of types of light sources that emit light of different colors and a reflective-type circularly polarizing plate having a plurality of types of cholesteric liquid crystal layers each having a center wavelength of an effective wavelength range corresponding to each light source, and thus can grow plants whose growth can be promoted with light of different colors.

For example, when the red-reflecting cholesteric liquid crystal layer 36R and the blue-reflecting cholesteric liquid crystal layer 36B of the reflective-type circularly polarizing plate 18 both reflect right-handed circularly polarized light, the plant growth lighting fixture 10 can promote, by switching on the red light source 14R, the growth of a plant whose growth can be promoted by irradiation with red left-handed circularly polarized light and can promote, by switching on the blue light source 14B, the growth of a plant whose growth can be promoted by irradiation with blue left-handed circularly polarized light. That is to say, according to this configuration, the growth of plants that are irradiated with left-handed circularly polarized light of different colors for growth promotion can be promoted by changing the light source switched on.

For example, when the red-reflecting cholesteric liquid crystal layer 36R and the blue-reflecting cholesteric liquid crystal layer 36B of the reflective-type circularly polarizing plate 18 both reflect left-handed circularly polarized light, the plant growth lighting fixture 10 can promote the growth of plants that are irradiated with right-handed circularly polarized light of different colors for growth promotion, that is, a plant whose growth can be promoted by red right-handed circularly polarized light and a plant whose growth can be promoted by blue right-handed circularly polarized light, depending on the light source switched on.

For example, when the red-reflecting cholesteric liquid crystal layer 36R of the reflective-type circularly polarizing plate 18 reflects left-handed circularly polarized light and the blue-reflecting cholesteric liquid crystal layer 36B reflects right-handed circularly polarized light, the plant growth lighting fixture 10 can promote the growth of plants that are irradiated with circularly polarized light of different rotational directions and different colors for growth promotion, that is, a plant whose growth can be promoted by red right-handed circularly polarized light and a plant whose growth can be promoted by blue left-handed circularly polarized light, depending on the light source switched on.

Furthermore, for example, when the red-reflecting cholesteric liquid crystal layer 36R of the reflective-type circularly polarizing plate 18 reflects right-handed circularly polarized light and the blue-reflecting cholesteric liquid crystal layer 36B reflects left-handed circularly polarized light, the plant growth lighting fixture 10 can promote the growth of plants that are irradiated with circularly polarized light of different rotational directions and different colors for growth promotion, that is, a plant whose growth can be promoted by red left-handed circularly polarized light and a plant whose growth can be promoted by blue right-handed circularly polarized light, depending on the light source switched on.

The same effect is produced when a blue light source and a green light source are used as light sources and a blue-reflecting cholesteric liquid crystal layer and a green-reflecting cholesteric liquid crystal layer are used as cholesteric liquid crystal layers. The same effect is also produced when a green light source and a red light source are used as light sources and a green-reflecting cholesteric liquid crystal layer and a red-reflecting cholesteric liquid crystal layer are used as cholesteric liquid crystal layers.

Furthermore, also when a blue light source, a green light source, and a red light source are used as light sources and a blue-reflecting cholesteric liquid crystal layer, a green-reflecting cholesteric liquid crystal layer, and a red-reflecting cholesteric liquid crystal layer are used as cholesteric liquid crystal layers, the same effect is produced, and the growth of plants whose growth can be promoted with light of different colors can be promoted by the light of three colors.

In addition, when having a light source that emits infrared light and a cholesteric liquid crystal layer that selectively reflects infrared light, the promotion of plant growth due to infrared circularly polarized light as well as the circularly polarized light of two or more colors selected from the group consisting of blue light, green light, and red light can be achieved.

In the reflective-type circularly polarizing plate 18 used in the plant growth lighting fixture 10 according to the present invention, the rotational directions (senses) of the circularly polarized light reflected by the blue-reflecting cholesteric liquid crystal layer 36B and the red-reflecting cholesteric liquid crystal layer 36R may be the same or different, as described above.

When the reflective-type circularly polarizing plate has three or more cholesteric liquid crystal layers, the cholesteric liquid crystal layers may reflect circularly polarized light having the same rotational direction, or one or more of the cholesteric liquid crystal layers may reflect circularly polarized light having a rotational direction different from that of the circularly polarized light reflected by the other cholesteric liquid crystal layers.

In the plant growth lighting fixture according to present invention, at least one, preferably all, of the cholesteric liquid crystal layers of the reflective-type circularly polarizing plate may have scattering properties.

Thus, in the plant growth lighting fixture 10 in the illustrated example, at least one, particularly two, of the blue-reflecting cholesteric liquid crystal layer 36B and the red-reflecting cholesteric liquid crystal layer 36R of the reflective-type circularly polarizing plate 18 may have scattering properties.

The plant growth lighting fixture 10 in the illustrated example has the blue light source 14B and the red light source 14R, and, for example, the blue light source 14B and the red light source 14R are alternately arranged along the longitudinal direction of the housing 24. Accordingly, blue light and red light radiated from the plant growth lighting fixture 10 may have unevenness in light intensity in a direction in which the light sources are arranged.

However, if the blue-reflecting cholesteric liquid crystal layer 36B and/or the red-reflecting cholesteric liquid crystal layer 36R has scattering properties, light suitably scatters in the lighting fixture main body 12 (the housing 24), whereby the light intensity of blue light and red light radiated from the plant growth lighting fixture 10 can be even.

One example of a cholesteric liquid crystal layer having scattering properties is a cholesteric liquid crystal layer in which bright portions and dark portions derived from a cholesteric liquid crystalline phase have a wave-like structure (flapping structure, undulating structure).

When a section of a cholesteric liquid crystal layer is observed under a scanning electron microscope (SEM), a striped pattern (layer structure) in which bright portions (bright lines) and dark portions (dark lines) derived from a cholesteric liquid crystalline phase are alternately stacked in the thickness direction is observed in the section.

Figure 4:
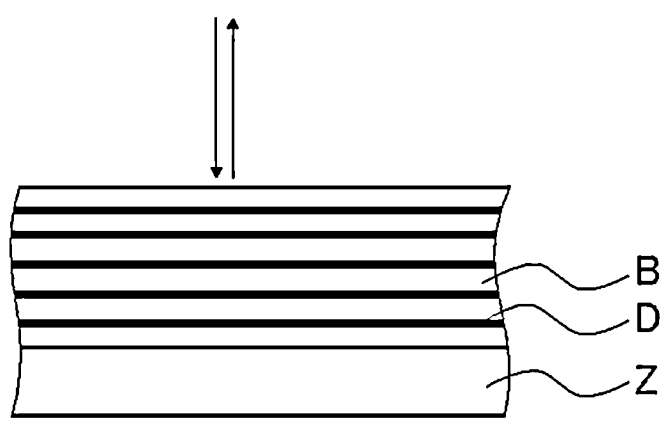
FIG. 4 is a conceptual illustration of a standard cholesteric liquid crystal layer.

FIG. 4 conceptually illustrates a section, as observed with SEM, of a typical cholesteric liquid crystal layer formed by fixing a cholesteric liquid crystalline phase.

In the typical cholesteric liquid crystal layer, a striped pattern of bright portions B and dark portions D is formed in parallel to a surface of a substrate Z (forming surface), as illustrated in FIG. 4. In the case of such a configuration, the cholesteric liquid crystal layer exhibits specular reflection That is to say, a standard cholesteric liquid crystal layer specularly reflects incident circularly polarized light. For example, when light is incident from the normal direction, the light is reflected in the normal direction but is less likely to be reflected in oblique directions, which means poor scattering properties (see arrows in FIG. 4).

Figure 5:
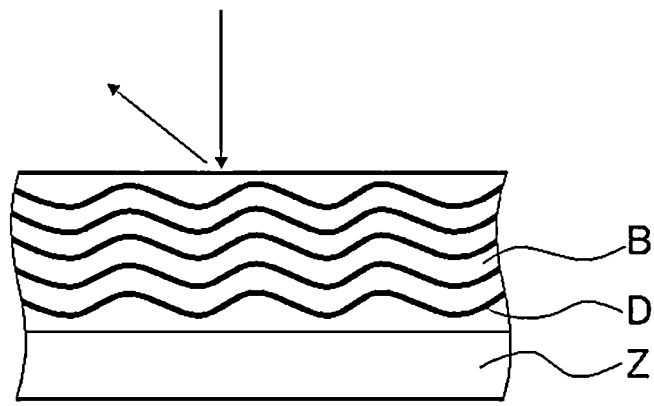
FIG. 5 is a conceptual illustration of a cholesteric liquid crystal layer having scattering properties.

In contrast, in the case where bright portion B and dark portions D have a wave-like structure as in a cholesteric liquid crystal layer whose section is conceptually illustrated in FIG. 5, when light is incident from the normal direction of the cholesteric liquid crystal layer, part of the incident light is reflected in an oblique direction since there is a region where the helical axis of a liquid crystal compound in tilted, as conceptually illustrated in FIG. 5 (see arrows in FIG. 5).

That is to say, when bright portions B and dark portions D have a wave-like structure in a cholesteric liquid crystal layer formed by fixing a cholesteric liquid crystalline phase, a reflecting layer having scattering properties can be achieved.

Such a cholesteric liquid crystal layer having a wave-like structure can be formed by forming a cholesteric liquid crystal layer on an alignment film not subjected to alignment treatment such as rubbing treatment.

For example, in the case of the reflective-type circularly polarizing plate 18 in the illustrated example, the red-reflecting cholesteric liquid crystal layer 36R can be formed so as to have a wave-like structure by forming the red-reflecting cholesteric liquid crystal layer 36R on the alignment film 32 without performing any alignment treatment such as rubbing on the alignment film 32. In the case of the formation of the blue-reflecting cholesteric liquid crystal layer 36B using the release transfer described above, the blue-reflecting cholesteric liquid crystal layer 36B can be formed so as to have a wave-like structure by forming the blue-reflecting cholesteric liquid crystal layer 36B on an alignment film formed on a substrate without performing any alignment treatment such as rubbing on the alignment film.

Alternatively, a cholesteric liquid crystal layer can be formed so as to have a wave-like structure also by forming the cholesteric liquid crystal layer on a surface of a substrate that is not an alignment film.

When a cholesteric liquid crystal layer is formed on an alignment film not subjected to alignment treatment, since there is no horizontal alignment restriction on the liquid crystal compound, the liquid crystal compound is aligned in various directions on the surface of the alignment film depending on the physical properties of the alignment film. When the cholesteric liquid crystal layer is formed in such a state, the helical axis of the liquid crystal compound constituting the cholesteric liquid crystalline phase is oriented in various directions, and as a result, a striped pattern of bright portions B and dark portions D forms a wave-like structure in the cholesteric liquid crystal layer.

In the reflective-type circularly polarizing plate 18, the polarization correction layer 38 is disposed between the blue-reflecting cholesteric liquid crystal layer 36B and the red-reflecting cholesteric liquid crystal layer 36R.

The polarization correction layer 38 is a layer having a phase difference in the thickness direction. That is to say, the polarization correction layer 38 is a layer having a thickness-direction retardation Rth.

Due to the presence of the polarization correction layer 38, the plant growth lighting fixture 10 according to the present invention can suppress a decrease in the degree of circular polarization of, particularly, red light.

The plant growth lighting fixture according to the present invention has two or more of a blue light source, a green light source, and a red light source and two or more of a blue-reflecting cholesteric liquid crystal layer, a green-reflecting cholesteric liquid crystal layer, and a red-reflecting cholesteric liquid crystal layer, and the emission center wavelengths of the light sources and the effective-wavelength-range center wavelengths of the cholesteric liquid crystal layers are present in wavelength ranges of the same colors. That is to say, the colors of light emitted from the light sources and the colors of circularly polarized light selectively reflected by the cholesteric liquid crystal layers are the same.

As described above, this configuration enables the plant growth lighting fixture according to the present invention to promote the growth of plants whose growth can be promoted by circularly polarized light of different colors.

The present inventors have conducted intensive studies on such a plant growth lighting fixture having a plurality of types of light sources and cholesteric liquid crystal layers and found that the degree of circular polarization of light, particularly, with a long wavelength is low. That is to say, it has been found that for visible light, the degree of circular polarization of, particularly, red light is low.

If the degree of circular polarization of irradiation light is low, the plant growth promoting effect produced by particular circularly polarized light of a particular color is reduced.

The present inventors have conducted further studies on this point and found that the cause of this is that the cholesteric liquid crystal layers have a thickness-direction retardation Rth.

That is to say, as circularly polarized light outside the effective wavelength range passes through any of the cholesteric liquid crystal layers, the circularly polarized light is converted into elliptically polarized light due to the thickness-direction retardation Rth of the cholesteric liquid crystal layer.

As a result, the circularly polarized light outside the effective wavelength range transmitted through the cholesteric liquid crystal layer has a lower degree of circular polarization. That is to say, as circularly polarized light outside the effective wavelength range passes through any of the cholesteric liquid crystal layers, the circularly polarized light is intermixed with linearly polarized light due to the thickness-direction retardation Rth of the cholesteric liquid crystal layer, thus decreasing the degree of circular polarization.

This decrease in the degree of circular polarization increases as the wavelength of light increases. When light is incident on the cholesteric liquid crystal layer obliquely with respect to the normal, a blue shift (short-wave shift) occurs, resulting in a shift of the effective wavelength range to the shorter-wavelength side. Light with a long wavelength is greatly affected because the light reflected as a result of the blue shift is visible light. In contrast, light with a shorter wavelength is not affected much because the light reflected as a result of the blue shift is ultraviolet light. Therefore, when circularly polarized light outside the effective wavelength range passes through the cholesteric liquid crystal layer, red light is most likely to undergo a decrease in the degree of circular polarization, and blue light is least likely to undergo a decrease in the degree of circular polarization.

For the decrease in the degree of circular polarization, as the difference between the effective wavelength range of the cholesteric liquid crystal layer and the center wavelength of transmitted light increases, the decrease in the degree of circular polarization on the longer wavelength side increases. That is to say, in the case of the plant growth lighting fixture 10 that radiates red light and blue light as in the illustrated example, the degree of circular polarization of, particularly, red light decreases greatly.

In contrast, in the plant growth lighting fixture 10 according to the present invention, the reflective-type circularly polarizing plate 18 has the polarization correction layer 38 having a phase difference in the thickness direction.

Thus, if circularly polarized light outside the effective wavelength range of the cholesteric liquid crystal layer passes through the cholesteric liquid crystal layer and is converted into elliptically polarized light due to the thickness-direction retardation Rth of the cholesteric liquid crystal layer, the elliptically polarized light can be restored to circularly polarized light due to the thickness-direction retardation Rth of the polarization correction layer 38, as it passes through the polarization correction layer 38.

On the other hand, when circularly polarized light first passes through the polarization correction layer 38 and then through the cholesteric liquid crystal layer having a different effective wavelength range, since the circularly polarized light is converted into elliptically polarized light due to the thickness-direction retardation Rth of the polarization correction layer 38, the elliptically polarized light is restored to circularly polarized light due to the thickness-direction retardation Rth of the cholesteric liquid crystal layer, as it passes through the cholesteric liquid crystal layer having a different effective wavelength range.

As a result, the plant growth lighting fixture 10 according to the present invention can suitably promote plant growth by irradiation with circularly polarized light having a high degree of circular polarization. In particular, when red light with a long wavelength is used, and when the difference between the center wavelength of a light source and the effective-wavelength-range center wavelength of a cholesteric liquid crystal layer is large, that is, when red light and blue light are radiated as in the illustrated example, the effect of preventing a decrease in the degree of circular polarization is significant. Thus, in the present invention, the configuration having the blue light source 14B and the red light source 14R and the blue-reflecting cholesteric liquid crystal layer 36B and the red-reflecting cholesteric liquid crystal layer 36R is suitably used.

In the plant growth lighting fixture 10 according to the present invention, the degree of circular polarization of irradiation light is not limited, and is preferably 0.5 or more, preferably 0.7 or more.

The polarization correction layer 38 may be any type of sheet-like (film-like, plate-like) optical element having a retardation Rth in the thickness direction.

In particular, for example, C-plates are suitable.

C-plates are classified into two types: positive C-plates (+C-plates) and negative C-plates (—C-plates). Positive C-plates satisfy the relationship of formula (C1), and negative C-plates satisfy the relationship of formula (C2), where nx represents a refractive index in the slow axis direction (the direction in which the in-plane refractive index is maximum) in a C-plate plane, ny represents a refractive index in a direction perpendicular to the in-plane slow axis in the plane, and nz represents a refractive index in the thickness direction. Positive C-plates have negative Rth values, and negative C-plates have positive Rth values.

$$nz > nx \approx ny \quad \text{Formula (C1)}$$

$$nz < nx \approx ny \quad \text{Formula (C2)}$$

The symbol "≈" means not only that the two are completely the same but also that the two are substantially the same. For the phrase "substantially the same", "nx≈ny" also includes, for example, the case where (nx−ny)×d (where d is a film thickness) is 0 to 10 nm, preferably 0 to 5 nm.

Thus, the choice of a positive C-plate or a negative C-plate for use as the polarization correction layer 38 may be appropriately determined depending on whether the thickness-direction retardation Rth of a cholesteric liquid crystal layer having a shortest effective-wavelength-range center wavelength, that is, the blue-reflecting cholesteric liquid crystal layer 36B in the illustrated example, is positive or negative.

The thickness-direction retardation Rth of the C-plate is not limited and may be appropriately set to a thickness-direction retardation Rth that can offset the thickness-direction retardation Rth of a cholesteric liquid crystal layer having a shortest effective-wavelength-range center wavelength, that is, the blue-reflecting cholesteric liquid crystal layer 36B in the illustrated example.

The thickness-direction retardation Rth of the C-plate (the polarization correction layer 38) is not limited, and Rth (550) is preferably ±10 to 100 nm.

The retardation Rth of the cholesteric liquid crystal layer and the C-plate may be measured using AxoScan as described above.

All known C-plates such as films produced by aligning liquid crystal compounds and films produced by stretching polymers, such as resin films, can be used. The C-plate may also be a commercially available optical film.

The reflective-type circularly polarizing plate 18 of the plant growth lighting fixture 10 according to the present invention may have any layer configuration having two or more cholesteric liquid crystal layers with center wavelengths in different wavelength ranges and the polarization correction layer 38.

Thus, in the reflective-type circularly polarizing plate 18, the blue-reflecting cholesteric liquid crystal layer 36B may be located on the light-transmitting plate 26 side (the light source side).

The polarization correction layer 38 need not necessarily be located between the blue-reflecting cholesteric liquid crystal layer 36B and the red-reflecting cholesteric liquid crystal layer 36R as in the illustrated example. The polarization correction layer 38 may be disposed on the light-transmitting plate 26 side with respect to the blue-reflecting cholesteric liquid crystal layer 36B and the red-reflecting cholesteric liquid crystal layer 36R, with the cholesteric liquid crystal layers being bonded together with the adhesive layer 40, or may be disposed on the opposite side of the cholesteric liquid crystal layers from the light-transmitting plate 26. The cholesteric liquid crystal layers and the polarization correction layer 38 may be formed on the other surface of the support 30.

The reflective-type circularly polarizing plate 18 preferably, but not necessarily, has a low haze. Specifically, the haze of the reflective-type circularly polarizing plate 18 is preferably 1% or less, more preferably 0.5% or less.

The reflective-type circularly polarizing plate 18 having a haze of 1% or less is preferred in that a plant can be efficiently irradiated with light emitted from the blue light source 14B and the red light source 14R.

The haze of the reflective-type circularly polarizing plate may be measured in accordance with JIS K 7136 (2000) using, for example, SH-7000 manufactured by Nippon Denshoku Industries Co., Ltd.

In the plant growth lighting fixture 10, the reflective-type circularly polarizing plate 18 is affixed (bonded) to the light-transmitting plate 26 with the adhesive layer 42 interposed therebetween.

The adhesive layer 42 is not limited, and any known adhesive can be used as long as it has sufficient transparency to blue light and red light.

Specifically, for example, the above-described adhesives usable for the adhesive layer 40 may be used.

The thickness of the adhesive layer 42 is also not limited, and a thickness that can provide sufficient adhesion may be appropriately set according to the type of adhesive for forming the adhesive layer 42.

The thickness of the adhesive layer 42 is preferably 1 to 50 μm, more preferably 10 to 30 μm.

In the plant growth lighting fixture 10 according to the present invention, the adhesive layer 42 need not necessarily be used to fix the reflective-type circularly polarizing plate 18 to the lighting fixture main body 12.

For example, the reflective-type circularly polarizing plate 18 may be releasably affixed to the light-transmitting plate 26 by affixing the reflective-type circularly polarizing plate 18 to the light-transmitting plate 26 with, in place of the adhesive layer 42, a tacky layer formed of a tackiness agent, such as a silicone tackiness agent or an acrylic tackiness agent, interposed therebetween.

Alternatively, configurations in which the reflective-type circularly polarizing plate 18 is detachably attached to the lighting fixture main body 12 using known fixing means, such as long grooves (recesses) for insertion of opposite transverse end portions of the reflective-type circularly polarizing plate 18, fitting of a protrusion into a recess, the use of a fixing jig such as a clamp, fastening with a screw, and a bolt and a nut, can also be used.

With these configurations, if a plurality of types of reflective-type circularly polarizing plates, such as a reflective-type circularly polarizing plate having cholesteric liquid crystal layers that reflect circularly polarized light having different rotational directions and a reflective-type circularly polarizing plate having cholesteric liquid crystal layers that have different effective-wavelength-range center wavelengths, are provided, and the reflective-type circularly polarizing plates are replaced depending on the plant to be grown, a wider variety of plants can be grown.

Although the reflective-type circularly polarizing plate 18 in the illustrated example has the red-reflecting cholesteric liquid crystal layer 36R, the polarization correction layer 38, and the blue-reflecting cholesteric liquid crystal layer 36B on one surface of the support 30 and the adhesive layer 42 on the other surface of the support 30, the present invention is not limited to this configuration.

Figure 6:
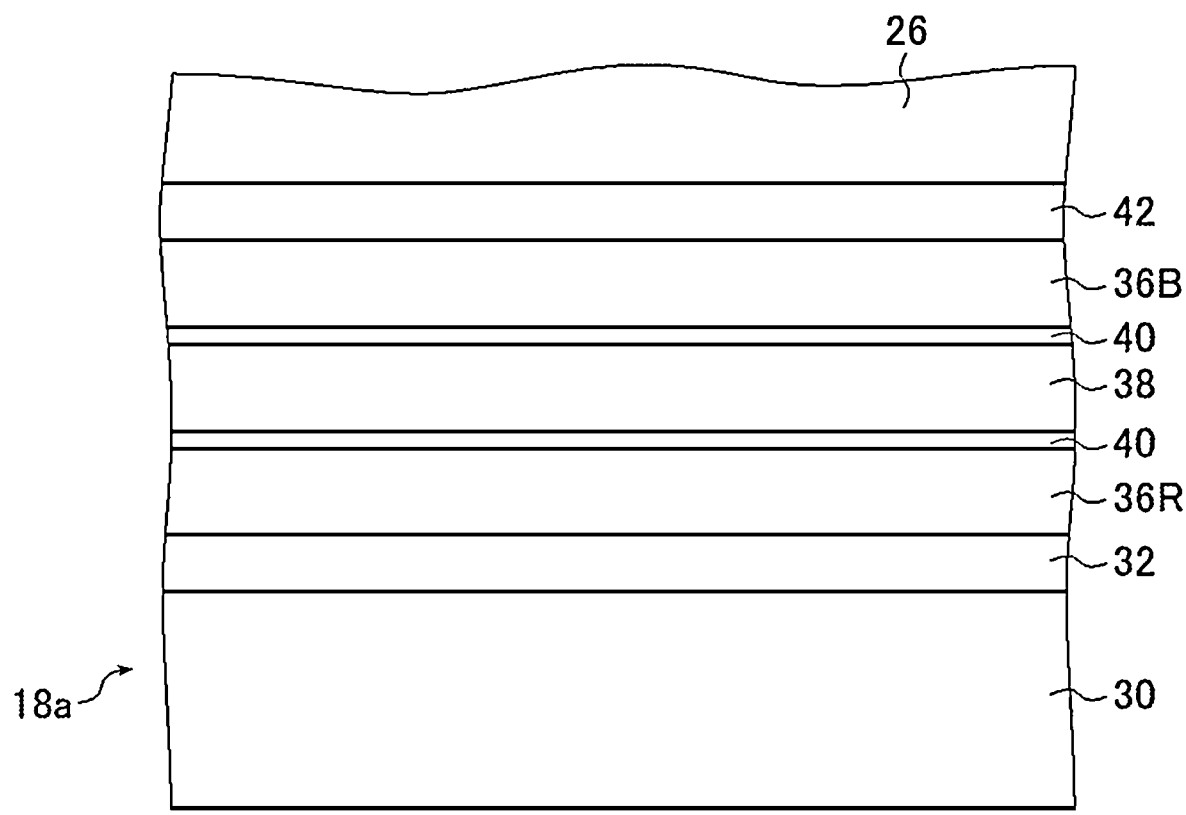
FIG. 6 conceptually illustrates another example of a reflective-type circularly polarizing plate used for a plant growth lighting fixture according to the present invention.

For example, in the plant growth lighting fixture according to the present invention, a reflective-type circularly polarizing plate, such as a reflective-type circularly polarizing plate 18a illustrated in FIG. 6, in which the red-reflecting cholesteric liquid crystal layer 36R, the polarization correction layer 38, and the blue-reflecting cholesteric liquid crystal layer 36B are disposed on one surface of the support 30 and the adhesive layer 42 is disposed on the surface of the blue-reflecting cholesteric liquid crystal layer 36B can also be used.

In this configuration, the outermost layer is the support 30, and thus the support 30 can act as a protective layer for the cholesteric liquid crystal layers and other layers.

Here, in the reflective-type circularly polarizing plate 18 illustrated in FIG. 3, light passes through the support 30 and then enters the red-reflecting cholesteric liquid crystal layer 36R and the blue-reflecting cholesteric liquid crystal layer 36B, and right-handed circularly polarized light and/or left-handed circularly polarized light in the effective wavelength range is transmitted.

In contrast, in the reflective-type circularly polarizing plate 18a illustrated in FIG. 6, only right-handed circularly polarized light or left-handed circularly polarized light in the effective wavelength range is transmitted through the blue-reflecting cholesteric liquid crystal layer 36B and the red-reflecting cholesteric liquid crystal layer 36R, and then left-handed circularly polarized light and/or right-handed circularly polarized light in the effective wavelength range enters and passes through the support 30. Thus, if the support 30 has a large in-plane retardation Re, the state of left-handed circularly polarized light or right-handed circularly polarized light in the effective wavelength range for the promotion of plant growth may change to decrease the degree of circular polarization, thus reducing the plant growth promoting effect.

Thus, in the reflective-type circularly polarizing plate 18a in which light passes through the blue-reflecting cholesteric liquid crystal layer 36B and the red-reflecting cholesteric liquid crystal layer 36R and then through the support 30, as illustrated in FIG. 6, the support 30 is preferably formed of a material having a small in-plane retardation Re, such as TAC or an acrylic resin.

Specifically, when light passes through the cholesteric liquid crystal layers 36 and then through the support 30, the in-plane retardation Re (550) at 550 nm of the support 30 is preferably 50 nm or less, more preferably 10 nm or less.

As described above, the plant growth lighting fixture 10 according to the present invention promotes plant growth by irradiating a plant with right-handed circularly polarized light or left-handed circularly polarized light in a wavelength range effective for the promotion of plant growth. Here, the mechanism concerning the plant growth lighting fixture 10 according to the present invention is presumably as follows.

Photoreceptors such as phytochromes, cryptochromes, phototropins, and ZEITLUPE (ZTL), which are involved in, for example, the flower-bud formation promotion, inhibition, and growth control of plants, contain the chromophores phytochromobilin and flavin, which serve as chiral agents and thus exhibit absorption dichroism for circularly polarized light in and around the light absorption wavelength range. That is to say, the photoreceptors more easily absorb either left-handed or right-handed circularly polarized light and less easily absorb circularly polarized light of opposite sense; therefore, it is difficult to induce the function of the photoreceptors by irradiation with circularly polarized light of opposite sense. Thus, it is probable that irradiation with either left-handed or right-handed circularly polarized light alone causes the phenomenon where the degree of growth varies. However, this absorption dichroism is a phenomenon that can be observed in a solution system on a laboratory level; in practice, it is generally thought that the phenomenon described above does not appear because the polarization state is disturbed as the polarized light is scattered by intracellular substances before reaching the chromophores. Surprisingly, however, it has been found that, according to the present invention, plant growth can be controlled depending on the polarization state of irradiation light even in leaves and stems, where the photoreceptors are present.

Phytochromes, which are involved in plant photoperiodism, are present in the red-light absorbing form, which has a maximum absorption around 650 nm, or the far-red-light absorbing form, which has a maximum absorption around 750 nm. Irradiation with light around 650 nm converts the red-light absorbing form into the far-red-light absorbing form, whereas irradiation with light around 750 nm converts the far-red-light absorbing form into the red-light absorbing form. The conversion of the far-red-light absorbing form into the red-light absorbing form also proceeds in dark conditions over time. The amount of far-red-light absorbing form produced by these reactions controls when plants bloom. These reactions can be artificially controlled to control when plants bloom, for example, as in nighttime illumination for the cultivation of plants such as chrysanthemum. If the plant growth lighting fixture 10 according to the present invention is used for such illumination as a light source that emits right-handed circularly polarized light, which is absorbed by phytochromes, only in the absorption wavelength range of phytochromes, the required power consumption can be reduced without decreasing the effect of electric illumination.

Since there are various plants and numerous types of chromophores on earth, it is important to change the effective wavelength range where one circularly polarized light is selected and the rotational direction (sense) of the circularly polarized light depending on factors such as the type of plant and/or the purpose of control. It may, of course, be preferred in some cases to simultaneously irradiate plants with circularly polarized light of different senses, for example, right-handed circularly polarized light in one wavelength range and left-handed circularly polarized light in another wavelength range. The plant growth lighting fixture 10 according to the present invention can also be used for such purposes, as described above.

The wavelength range of the circularly polarized light radiated from the plant growth lighting fixture 10 according to the present invention may be changed by replacing the reflective-type circularly polarizing plate 18 depending on the stage of the plant growth cycle, such as dormancy, germination, seedling, cell growth period, or flower-bud differentiation. In addition, irradiation timing, light intensity, polarization state, and other conditions may be adjusted depending on the stage of the diurnal cycle. Furthermore, for example, pulsed light may be used, and light with different polarization states may be used for different parts of the plants to be irradiated. In plant factories, irradiation with light by the plant growth lighting fixture according to the present invention may be combined with humidity, temperature, and gas concentration control.

The target plant for the plant growth lighting fixture 10 according to the present invention is not particularly limited and can be appropriately selected according to the purpose.

Examples of plants include vegetables in the Cucurbitaceae family, the Solanaceae family, the Fabaceae family, the Rosaceae family, the Brassicaceae family, the Asteraceae family, the Apiaceae family, the Chenopodiaceae family, the Poaceae family, the Malvaceae family, the Araliaceae family, the Lamiaceae family, the Zingiberaceae family, the Nymphaeaceae family, and the Araceae family; flowering plants for cutting and potting in the Asteraceae family, the Rosaceae family, the Araceae family, the Caryophyllaceae family, the Brassicaceae family, the Plumbaginaceae family, the Gentianaceae family, the Scrophulariaceae family, the Fabaceae family, the Paeoniaceae family, the Iridaceae family, the Solanaceae family, the Amaryllidaceae family, the Orchidaceae family, the Agavaceae family, the Cornaceae family, the Rubiaceae family, the Salicaceae family, the Ericaceae family, the Oleaceae family, the Magnoliaceae family, the Primulaceae family, the Begoniaceae family, the Lamiaceae family, the Geraniaceae family, the Crassulaceae family, the Ranunculaceae family, the Gesneriaceae family, the Cactaceae family, the fern family, the Araliaceae family, the Moraceae family, the Commelinaceae family, the Bromeliaceae family, the Marantaceae family, the Euphorbiaceae family, the Piperaceae family, the Saxifragaceae family, the Onagraceae family, the Malvaceae family, the Myrtaceae family, the Theaceae family, and the Nyctaginaceae family; fruit trees in the Rosaceae family, the Vitaceae family, the Moraceae family, the Ebenaceae family, the Ericaceae family, the Lardizabalaceae family, the Actinidiaceae family, the Passifloraceae family, the Rutaceae family, the Anacardiaceae family, the Bromeliaceae family, and the Myrtaceae family; and algae.

Specific examples include vegetables such as cucumbers, melons, squashes, bitter gourds, zucchinis, watermelons, oriental pickling melons, wax gourds, sponge gourds, spaghetti squashes, tomatoes, green peppers, red peppers, eggplants, pepinos, shishito peppers, peas, green beans, cowpeas, green soybeans, broad beans, winged beans, podded peas, podded green beans, hyacinth beans, strawberries, corn, okra, broccoli, radish sprouts, watercress, komatsuna, tukena, lettuce, giant butterbur, crown daisy, edible chrysanthemum, celery, parsley, mitsuba, seri, negi, wakegi, Chinese chive, asparagus, spinach, saltwort, udo, shiso, ginger, daikon, turnips, wasabi, radishes, rutabaga, kokabu, garlic, rakkyo, root lotus, and taro; flowering plants such as aster, rhodanthe, thistle, dianthus, stock, canola, statice, eustoma, snapdragon, sweet pea, Japanese iris, chrysanthemum, liatris, gerbera, marguerite, gymnaster, Shasta daisy, carnation, baby's-breath, Japanese gentian, Chinese peony, bladder cherry, chelone, dahlia, calla, gladiolus, iris, freesia, tulip, narcissus, amaryllis, cymbidium, dracaena, rose, Japanese quince, cherry blossom, peach, ume, reeves spirea, bramble, Japanese rowan, dogwood, Japanese cornel, Chinese ixora, bouvardia, willow, azalea, forsythia, lily magnolia, cineraria, dimorphotheca, primula, petunia, begonia, coleus, geranium, pelargonium, rochea, anthurium, clematis, lily-of-the-valley, saintpaulia, cyclamen, ranunculus, gloxinia, dendrobium, cattleya, phalaenopsis, vanda, epidendrum, oncidium, schlumbergera truncata, schlumbergera russeliana, epiphyllum, kalanchoe, nephrolepis, adiantum, asplenium, pothos, dieffenbachia, spathiphyllum, syngonium, spider plant, schefflera, hedera, rubber tree, dracaena, cordyline, bridal veil, ananas, calathea, croton, peperomia, poinsettia, hydrangea, fuchsia, hibiscus, gardenia, manuka, camellia, bougainvillea, and tree peony; fruit trees such as Japanese pears, peaches, cherries, plums, apples, prunes, nectarines, apricots, raspberries, ume, grapes, figs, persimmons, blueberries, chocolate vines, kiwi fruit, passion fruit, loquats, citrus unshiu, murcotts, lemons, yuzu, Buddha's hand, hassaku, pomelos, hanayuzu, kumquats, seminole, iyokan, navel oranges, encore, nova, hyuganatsu, limes, sudachi, kabosu, banpeiyu, tankan, mangoes, pineapples, and guavas; and algae.

Preferred of these are leaf vegetables, particularly komatsuna, which is a type of tukena in the Brassicaceae family.

While the plant growth lighting fixture according to the present invention has been described in detail above, the present invention is not limited to the foregoing example; it should be appreciated that various improvements and modifications may be made without departing from the spirit of the invention.

EXAMPLES

The features of the present invention will now be described more specifically with reference to examples. The materials, reagents, amounts used, amounts of substance, proportions, processes, process sequences, and other details given in the following examples can be changed as appropriate without departing from the spirit of the invention. Thus, the specific examples given below should not be construed as limiting the scope of the invention.

Preparation of Coating Solution

Coating solutions A to D shown in Table 1 below were prepared. In Table 1, numerical values regarding the composition of the coating solutions are expressed in parts by mass.

The coating solution A is a coating solution for forming a cholesteric liquid crystal layer that reflects blue right-handed circularly polarized light. The coating solution B is a coating solution for forming a cholesteric liquid crystal layer that reflects blue left-handed circularly polarized light. The coating solution C is a coating solution for forming a cholesteric liquid crystal layer that reflects red right-handed circularly polarized light. The coating solution D is a coating solution for forming a cholesteric liquid crystal layer that reflects red left-handed circularly polarized light.

TABLE 1

|  |  | Coating solution 1 | Coating solution 2 | Coating solution 3 | Coating solution 4 |
|---|---|---|---|---|---|
| Composition | Polymerizable liquid crystal compound 1 | 50 | 50 | 50 | 50 |
|  | Polymerizable liquid crystal compound 2 | 50 | 50 | 50 | 50 |
|  | Paliocolor LC-756, manufactured by BASF | 7.6 | 0 | 4.7 | 0 |
|  | Compound 3 (alignment control agent) | 0 | 11 | 0 | 7.5 |
|  | Compound 4 (alignment control agent) | 0.04 | 0.04 | 0.04 | 0.04 |
|  | Polymerization initiator | 3 | 3 | 3 | 3 |
|  | Chloroform | 300 | 300 | 300 | 300 |
| Properties | Circularly polarized light reflected (helical sense) | right | left | right | left |
|  | Effective-wavelength-range center wavelength [nm] | 430 | 440 | 700 | 720 |

The polymerization initiator is Irgacure-819 manufactured by Ciba Specialty Chemicals.

Polymerizable liquid crystal compound 1

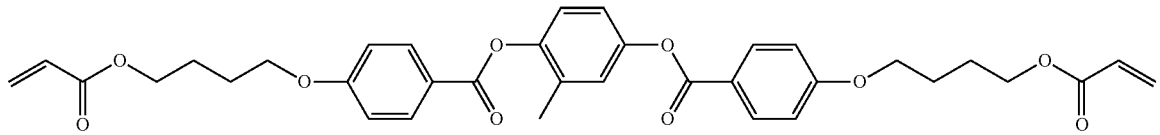 [SMILES: C=CC(=O)OCCCCOc1ccc(C(=O)Oc2ccc(OC(=O)c3ccc(OCCCCOC(=O)C=C)cc3)c(C)c2)cc1]

Polymerizable liquid crystal compound 2

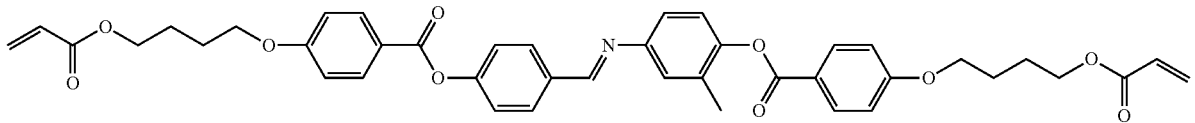 [SMILES: C=CC(=O)OCCCCOc1ccc(C(=O)Oc2ccc(/C=N/c3ccc(OC(=O)c4ccc(OCCCCOC(=O)C=C)cc4)c(C)c3)cc2)cc1]

Alignment control agent: Compound 3 (compound described in JP2002-80478A)

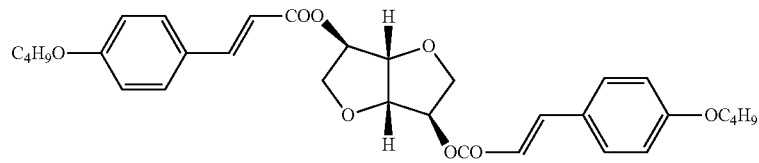

Alignment control agent: Compound 3 (compound described in JP2005-999248A)

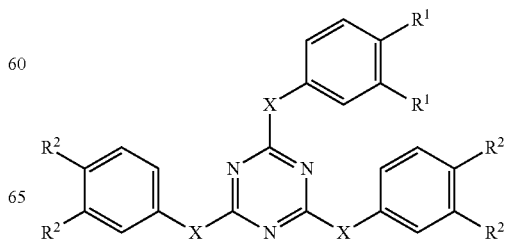

| R¹ | R² | X |
|---|---|---|
| O(CH$_2$)$_2$O(CH$_2$)$_2$(CF$_2$)$_6$F | O(CH$_2$)$_2$O(CH$_2$)$_2$(CF$_2$)$_6$F | NH |

Example 1

Formation of Alignment Film

A PET film (A4100 manufactured by Toyobo Co., Ltd.) having a thickness of 100 μm was provided as a support.

Using a wire bar, the following coating solution for an alignment film was applied to a surface of the support such that the thickness after drying would be 2 Coating solution for alignment film UV-curable resin (KAYARAD PET-30 manufactured by Nippon Kayaku Co., Ltd.): 40 parts by mass Compound A having the following structure: 0.004 parts by mass Polymerization initiator (Irgacure-819 mentioned above): 1.5 parts by mass Methyl ethyl ketone: 58.5 parts by mass Compound A

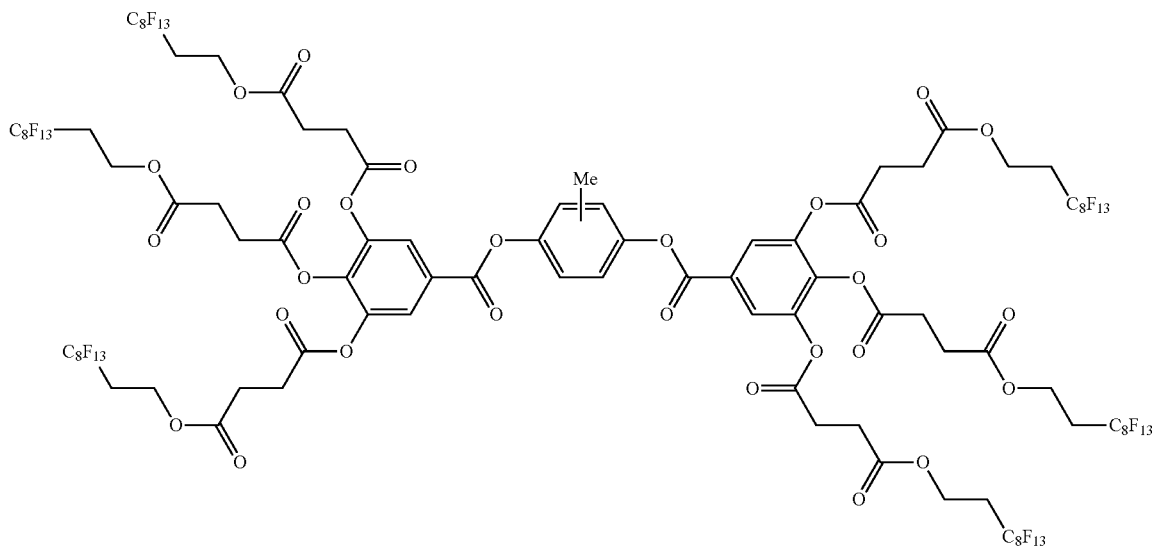

Thereafter, the resultant was dried at 60° C. for one minute and irradiated with ultraviolet light using a mercury lamp in a nitrogen atmosphere, thereby curing the coating solution for an alignment film to form a resin layer. The amount of light irradiation was 200 mJ/cm².

The surface of the cured resin layer was subjected to rubbing treatment to form an alignment film.

Formation of Red-Reflecting Cholesteric Liquid Crystal Layer

Using a wire bar, the coating solution C was applied to the surface of the alignment film such that the thickness after drying would be 4 μm, and aged at 100° C. for one minute.

Thereafter, the coating was irradiated with ultraviolet light at 30° C. with a D-bulb lamp (90 mW/cm) manufactured by Fusion UV Systems at a power of 60% for 12 seconds to fix a cholesteric liquid crystalline phase. As a result of this, a red-reflecting cholesteric liquid crystal layer having a center wavelength of an effective wavelength range of 700 nm and reflecting right-handed circularly polarized light was formed on the surface of the alignment film.

Formation of C-Plate

The following coating solution for a C-plate was prepared.

Coating Solution for C-Plate

UV-curable resin (A-TMM-3 manufactured by Shin-Nakamura Chemical Co., Ltd.): 19.2 parts by mass UV-curable resin (BLEMMER GLM manufactured by NOF Corporation): 9.6 parts by mass Horizontal alignment agent having the following structure: 0.007 parts by mass Polymerization initiator (Irgacure-819 mentioned above): 1.2 parts by mass Methyl ethyl ketone: 24.5 parts by mass Cyclohexanone: 45.5 parts by mass Horizontal alignment agent

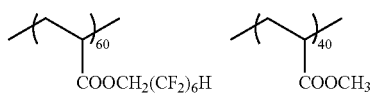

Using a wire bar, the coating solution for a C-plate was applied to the surface of the above-mentioned support such that the thickness after drying would be 1.5 μm, and aged at 80° C. for one minute. Thereafter, the coating was irradiated with ultraviolet light at 30° C. with a D-bulb lamp (90 mW/cm) manufactured by Fusion UV Systems at a power of 60% for 12 seconds, whereby curing the coating solution for a C-plate to prepare a C-plate.

An OCA (PANACLEAN PD-R1 manufactured by PANAC Corporation) was affixed to the surface of the prepared C-plate, and the OCA was affixed to the red-reflecting cholesteric liquid crystal layer, after which the support was peeled off to form the C-plate (polarization correction layer) on the surface of the red-reflecting cholesteric liquid crystal layer.

The C-plate was also affixed to optical glass in the same manner, and the thickness direction Rth (550) of the C-plate was measured with AxoScan as described above. The thickness direction Rth (550) of the C-plate was 90 nm.

Formation of blue-reflecting cholesteric liquid crystal layer

A support having a rubbing-treated alignment film was formed by the same procedure as used to form the red-reflecting cholesteric liquid crystal layer.

Using a wire bar, the coating solution B was applied to the surface of the alignment film such that the thickness after drying would be 4 μm, and aged at 100° C. for one minute. Thereafter, the coating was irradiated with ultraviolet light at 30° C. with a D-bulb lamp (90 mW/cm) manufactured by Fusion UV Systems at a power of 60% for 12 seconds to fix a cholesteric liquid crystalline phase, whereby a blue-reflecting cholesteric liquid crystal layer having a center wavelength of an effective wavelength range of 440 nm and reflecting left-handed circularly polarized light was formed.

An OCA (PANACLEAN PD-R1 manufactured by PANAC Corporation) was affixed to the surface of the blue-reflecting cholesteric liquid crystal layer formed, and the OCA was affixed to the C-plate, after which the support and the alignment film were peeled off to form the blue-reflecting cholesteric liquid crystal layer on the surface of the C-plate. In this manner, a reflective-type circularly polarizing plate was fabricated (see FIG. 3).

Example 2

A reflective-type circularly polarizing plate was fabricated in the same manner as in Example 1 except that the coating solution C was replaced with the coating solution D in the formation of a red-reflecting cholesteric liquid crystal layer and that the coating solution B was replaced with the coating solution A in the formation of a blue-reflecting cholesteric liquid crystal layer.

The red-reflecting cholesteric liquid crystal layer of this reflective-type circularly polarizing plate has a center wavelength of an effective wavelength range of 720 nm and reflects left-handed circularly polarized light. The blue-reflecting cholesteric liquid crystal layer of this reflective-type circularly polarizing plate has a center wavelength of an effective wavelength range of 430 nm and reflects right-handed circularly polarized light.

Comparative Example 1 and Comparative Example 2

A reflective-type circularly polarizing plate was fabricated in the same manner as in Example 1, except for not having a C-plate (Comparative Example 1).

A reflective-type circularly polarizing plate was fabricated in the same manner as in Example 2, except for not having a C-plate (Comparative Example 2).

Production of Plant Growth Lighting Fixture and Measurement of Degree of Circular Polarization A rectangular parallelepipedal housing whose inner surface was a white reflective surface and one of the largest surfaces of which was open was provided.

On the side opposite to the open side of the housing, blue light sources and red light sources were alternately mounted at regular intervals in a linear fashion, and furthermore the open side of the housing was closed with the fabricated reflective-type circularly polarizing plate to produce a plant growth lighting fixture.

The blue light source used was an LED that emits blue light with an emission center wavelength of 460 nm (7 W/L020, blue, manufactured by Fuji Denshi Kogyo Co., Ltd.), and the red light source used was an LED that emits red light with an emission center wavelength of 630 nm (7 W/L020, red, manufactured by Fuji Denshi Kogyo Co., Ltd.).

For the plant growth lighting fixture produced, the degree of circular polarization of blue light and red light emitted from the reflective-type circularly polarizing plate was measured using a spectrophotometer (e.g., USB4000 manufactured by Ocean Optics, Inc.).

The measurement was performed by measuring the intensity of right-handed circularly polarization and left-handed circularly polarization with the reflective-type circularly polarizing plate mounted on a spectrophotometer. The measurement of the intensity of right-handed circularly polarization and left-handed circularly polarization was performed several times with varying angles of incidence, and their average values were used as the intensities of right-handed circularly polarization and left-handed circularly polarization. From the measured intensities of right-handed circularly polarization and left-handed circularly polarization, the degree of circular polarization was calculated using the above formula.

The results are shown in Table 2 below.

TABLE 2

| | Circularly polarized light reflected (sense) | | | Degree of circular polarization | |
|---|---|---|---|---|---|
| | Blue-reflecting layer | Red-reflecting layer | C-plate | Blue light | Red light |
| Example 1 | left | right | present | 0.87 | 0.84 |
| Example 2 | right | left | present | 0.86 | 0.85 |
| Comparative Example 1 | left | right | absent | 0.87 | 0.70 |
| Comparative Example 2 | right | left | absent | 0.86 | 0.69 |

The plant growth lighting fixtures of Example 1 and Comparative Example 1 are usable for the growth of plants whose growth can be promoted by irradiation with blue left-handed circularly polarized light and plants whose growth can be promoted by irradiation with red right-handed circularly polarized light. The plant growth lighting fixtures of Example 2 and Comparative Example 2 are usable for the growth of plants whose growth can be promoted by irradiation with blue right-handed circularly polarized light and plants whose growth can be promoted by irradiation with red left-handed circularly polarized light.

Here, as shown in Table 2, the plant growth lighting fixtures of Example 1 and Example 2, in each of which the reflective-type circularly polarizing plate has a C-plate (polarization correction layer), can radiate red light and blue light each with a high degree of circular polarization, and can suitably promote plant growth with either blue light or red light.

In contrast, in the plant growth lighting fixtures of Comparative Examples, in each of which the reflective-type circularly polarizing plate does not have a C-plate, the degree of circular polarization of blue light is comparable to those of the plant growth lighting fixtures according to the present invention, but the degree of circular polarization of red light, which is light with a long wavelength, is low, which means that the plant growth promoting effect of red light is small.

The above results demonstrate the advantageous effects of the present invention.

The present invention is suitable for use in plant cultivation.

REFERENCE SIGNS LIST 10 plant growth lighting fixture
12 lighting fixture main body
14B blue light source
14R red light source
16 light source unit
18, 18a reflective-type circularly polarizing plate
24 housing
24a opening
26 light-transmitting plate
30 support
32 alignment film
36B blue-reflecting cholesteric liquid crystal layer
36R red-reflecting cholesteric liquid crystal layer
38 polarization correction layer
40, 42 adhesive layer

What is claimed is:

1. A plant growth lighting fixture comprising:
light sources; and
a reflective-type circularly polarizing plate having cholesteric liquid crystal layers formed by fixing a cholesteric liquid crystalline phase,
wherein when a wavelength range of 380 nm or more and 500 nm or less is a blue wavelength range, a wavelength range of more than 500 nm and less than 600 nm is a green wavelength range, and a wavelength range of 600 nm or more and 780 nm or less is a red wavelength range,
the light sources have two or more of a blue light source having an emission center wavelength in the blue wavelength range, a green light source having an emission center wavelength in the green wavelength range, and a red light source having an emission center wavelength in the red wavelength range,
the reflective-type circularly polarizing plate has two or more of a blue-reflecting cholesteric liquid crystal layer having a center wavelength of an effective wavelength range in the blue wavelength range, a green-reflecting cholesteric liquid crystal layer having a center wavelength of an effective wavelength range in the green wavelength range, and a red-reflecting cholesteric liquid crystal layer having a center wavelength of an effective wavelength range in the red wavelength range,
the wavelength ranges of the emission center wavelengths as the light sources and the wavelength ranges of the center wavelength of the effective wavelength range as the reflective-type circularly polarizing plate are wavelength ranges of the same colors, and
the reflective-type circularly polarizing plate has a polarization correction layer having a phase difference in a thickness direction.

2. The plant growth lighting fixture according to claim 1, wherein the polarization correction layer is a C-plate.

3. The plant growth lighting fixture according to claim 1, wherein the light sources have the blue light source and the red light source, and
the reflective-type circularly polarizing plate has the blue-reflecting cholesteric liquid crystal layer and the red-reflecting cholesteric liquid crystal layer.

4. The plant growth lighting fixture according to claim 1, further comprising an auxiliary light source for emitting white light.

5. The plant growth lighting fixture according to claim 1, wherein the cholesteric liquid crystal layers of the reflective-type circularly polarizing plate selectively reflect circularly polarized light having the same rotational direction.

6. The plant growth lighting fixture according to claim 1, wherein the cholesteric liquid crystal layers of the reflective-type circularly polarizing plate selectively reflect circularly polarized light having different rotational directions.

7. The plant growth lighting fixture according to claim 1, wherein the reflective-type circularly polarizing plate has a haze of 1% or less.

8. The plant growth lighting fixture according to claim 1, wherein at least one of the cholesteric liquid crystal layers of the reflective-type circularly polarizing plate has scattering properties.

9. The plant growth lighting fixture according to claim 1, wherein the reflective-type circularly polarizing plate further has a support for supporting the cholesteric liquid crystal layers.

10. The plant growth lighting fixture according to claim 1, wherein the light sources each include a plurality of light sources arranged in a single direction.

11. The plant growth lighting fixture according to claim 1, wherein the light sources are LEDs.

* * * * *